United States Patent

Morimoto et al.

[11] Patent Number: 5,576,839
[45] Date of Patent: Nov. 19, 1996

[54] CAMERA SYSTEM INCLUDING A SEPARATABLE RECORDER

[75] Inventors: Yasuhiro Morimoto, Takatsuki; Hirokazu Naruto, Higashiosaka; Tsutomu Honda, Takatsuki; Gen Sasaki, Toyonaka, all of Japan

[73] Assignee: Minolta Camera Kabushiki Kaisha, Osaka, Japan

[21] Appl. No.: 215,966

[22] Filed: Mar. 18, 1994

Related U.S. Application Data

[62] Division of Ser. No. 949,579, Sep. 23, 1992, abandoned.

[30] Foreign Application Priority Data

Sep. 25, 1991 [JP] Japan .................................. 3-245824
May 12, 1992 [JP] Japan .................................. 4-119320
May 12, 1992 [JP] Japan .................................. 4-119321

[51] Int. Cl.[6] ............................ H04N 5/76; G11B 15/18
[52] U.S. Cl. ............................................ 386/113; 360/69
[58] Field of Search ............................... 358/335, 342, 358/310, 340; 360/32, 18, 128, 133, 69, 74.5, 99.02, 27; 369/71, 292

[56] References Cited

U.S. PATENT DOCUMENTS

| 4,734,815 | 3/1988 | Naganawa et al. | 360/133 |
| 4,868,642 | 9/1989 | Kaneko | 358/76 |
| 5,027,222 | 6/1991 | Shinbo et al. | 358/330 |
| 5,032,927 | 7/1991 | Watanabe et al. | 358/335 |
| 5,060,069 | 10/1991 | Aoki | 358/209 |
| 5,061,994 | 10/1991 | Takahashi | 358/342 |
| 5,063,447 | 11/1991 | Takeda | 358/145 |
| 5,067,029 | 11/1991 | Takahashi | 358/909 |
| 5,088,082 | 2/1992 | Yamada et al. | 369/71 |
| 5,164,831 | 11/1992 | Kuchta et al. | 358/209 |
| 5,239,384 | 8/1993 | Takei et al. | 358/335 |
| 5,257,111 | 10/1993 | Kakuyama | 358/342 |
| 5,303,220 | 4/1994 | Whitaker | 369/71 |
| 5,420,729 | 5/1995 | Lee et al. | 360/69 |
| 5,902,798 | 4/1993 | Takei et al. | 360/35.1 |

FOREIGN PATENT DOCUMENTS

| 58-38935 | 3/1983 | Japan . |
| 63-64485 | 3/1988 | Japan . |
| 1-264683 | 10/1989 | Japan . |

*Primary Examiner*—Thai Q. Tran
*Assistant Examiner*—Robert Chevalier
*Attorney, Agent, or Firm*—Brinks Hofer Gilson & Lione

[57] ABSTRACT

A photographed image recording and reproducing system includes a camera portion and a recording and reproducing portion. The camera portion has an image pick-up device for picking up an object image and producing an electrical image signal corresponding to the object image, a signal processing device for processing the electrical image signal into an analog image data signal, and an output device for outputting the analog image data signal. The recording and reproducing portion has a receiver device for receiving the analog image data signal, a conversion device for converting the analog image data signal to a digital image data signal, a memory device for storing the digital image data signal, a recording device for recording the stored digital image data signal on a record medium, and a reproducing device for reproducing the object image based on the recorded digital image data signal.

6 Claims, 23 Drawing Sheets

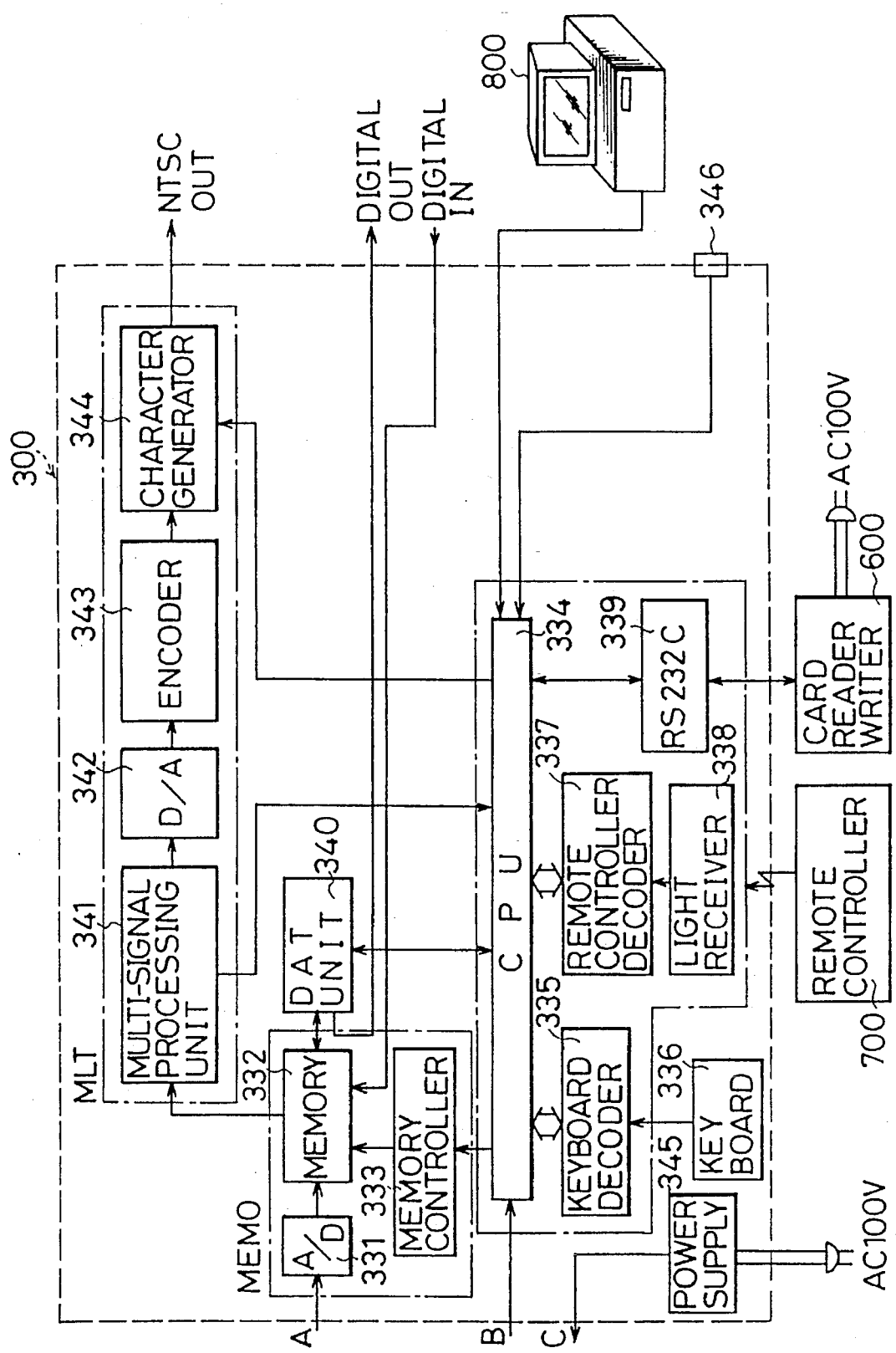

FIG. 15

| FILE No. | ID No. (10 FIGURES) | NAME (15 FIGURES) | DATE | SKIP? |
|---|---|---|---|---|
| 1 | 1001 | BIRD | 92.3.3 | NO |
| 2 | 2035 | DODO | 92.5.5 | NO |
|  |  |  |  |  |

CAMERA SYSTEM INCLUDING A SEPARATABLE RECORDER

BACKGROUND OF THE INVENTION AND RELATED STATEMENT

This application is a division of application Ser. No. 07/949,579, filed Sep. 23, 1992, now abandoned.

This invention relates to a photographed image recording and reproducing system including a still video camera for picking up an object image (still image) formed on an imaging plane by photoelectrically converting the same into an electric signal, and recording and reproducing device for recording the picked up image in a recording medium and reproducing the recorded image according to needs.

Conventionally, there has been proposed a still video cameras in which an object image is picked up by a solid state photoelectric conversion element, and the picked up image is stored in a memory having a small capacity which is detachably mountable to the still video camera as in Unexamined Japanese Patent Publication No. 63-64485.

The above publication does not disclose a recording and reproducing device which is externally connectable to the still video camera. Neither does this publication mention a construction of a photographed image recording and reproducing system for retrieving and reproducing the photographed image in conjunction with the recording and reproducing device. Further, the camera disclosed in this publication is not constructed specially suitable for use in the photographed image recording and reproducing system.

There is also known a photographed image recording and reproducing system consisting essentially of a still video camera including a detachable digital card having a small capacity, and a recording and reproducing device including a digital audio tape recorder (hereinafter referred to as a DAT recorder) having a large capacity. This system is of the so-called off-line type in which, after a photographed image of an object is recorded in the digital card, the digital card is set in the DAT recorder so as to retrieve, reproduce the photographed image, and use the same to prepare an album.

In the above photographed image recording and reproducing system, the digital card has to be set in the DAT recorder each time the photographed image is reproduced, and therefore the system suffers the inconvenience that it cannot reproduce the photographed image soon. Particularly, in the case where the system is used in a relatively fixed place, there is no special need for connecting off-line the camera and the DAT recorder, and the operability of the off-line type system is exceedingly reduced as described above.

On the other hand, in the case of an on-line type photographed image recording and reproducing system, the system encounters the following merit and demerit in consideration of transfer of stored contents from the small capacity storage medium (digital card) to the large capacity storage medium (DAT recorder) at a final stage. That is, the camera may be dispensed with a built-in storage medium having a small capacity while being obliged to be constructed larger size.

Further in the case where the DAT recorder is used as a recording and reproducing device for the photographed image recording and reproducing system, the DAT is formatted according to a specified format in advance, and the photographed images are recorded on the formatted DAT sequentially from a leading end thereof.

However, according to this recording method, since the photographed images are recorded in a record region of the DAT sequentially from the leading end thereof, the images are recorded in a chronological order regardless of relevance of information carried by the images. Thus, this recording method requires a longer time to access the recorded photographed image at the time of reproduction of the same, and also to retrieve the recorded photographed image.

In order to overcome the above problems, the following method has been adopted. Specifically, a table defining correspondence between the photographed images and record regions of the DAT is prepared by, for example, a personal computer, and desired photographed image is retrieved and the record region of the DAT is randomly accessed using this personal computer. However, according to this method, while a retrieving operation itself may be conducted more easily, a separate personal computer is necessary for retrieval of the image, thereby resulting in a larger size photographed image recording and reproducing system. In addition, it is necessary to prepare a correspondence table between the photographed images and the contents recorded on the DAT for each PAT, and accordingly the photographed images cannot be filed, or retrieved easily and rapidly.

It is an object of the invention to provide a photographed image recording and reproducing system which has overcome the above-mentioned drawbacks.

SUMMARY OF THE INVENTION

Accordingly, a photographed image recording and reproducing system of the invention comprises a camera portion including image pick-up means for picking up an object image and producing an electrical image signal corresponding to the object image, signal processing means for processing the electrical image signal into an analog image data signal, and output means for outputting the analog image data signal, and a recording and reproducing portion including receiver means for receiving the analog image data signal, conversion means for converting the analog image data signal to a digital image data signal, memory means for storing the digital image data signal, and recording means for recording the stored digital image data signal on a record medium, and reproducing means for reproducing the object image based on the recorded digital image data signal.

Also, the invention is directed to a recording and retrieving system comprising setting means for setting on a record medium an index region and an image block having a plurality of record units, code recording means for recording on the index region a first code for identifying the image block and a second code for identifying each record unit, input means for inputting a block retrieval code, and retrieval means for retrieving a desired record unit based on the block retrieval code, and the first and second codes recorded on the index region.

Further, the invention is directed to a recording system comprising image data recording means for executing a first recording mode where a plurality of image blocks are set on a record medium and image data is recorded on a specified image block, and a second recording mode where image data is on a record medium in sequence, and selection means for selecting either of the first and second recording modes.

Further, the invention is directed to a recording system comprising a mount portion in which a record medium is mounted, recording means for recording data on the record medium, discriminator means for discriminating whether an error occurs in the recording, and dismounting means for dismounting the record medium when an error is discriminated to occur.

Furthermore, the invention is directed to a recording system comprising a mount portion in which a record medium is mounted, recording means for recording data on the record medium, the recording means having a recording head, first discriminator means for discriminating whether an error occurs in recording operation, a cleaning member mountable in the mount portion in place of the record medium and adapted for cleaning the recording head, second discriminator means for discriminating whether the cleaning member is mounted, and control means responsive to the first and second discriminator means for controlling the recording means so that when an error is discriminated to occur by the first discriminator, recording operation is suspended until the cleaning member is discriminated to be mounted by the second discriminator.

Moreover, the invention is directed to a recording system comprising a mount portion in which a record medium is mounted, recording means for recording data on the record medium, first discriminator means for discriminating whether an error occurs in recording operation, dismounting means responsive to the first discriminator means for dismounting the record medium when an error is discriminated to occur, second discriminator means for discriminating whether a mounted record medium is different from the latest dismounted record medium, and display means responsive to the second discriminator for providing warning indicative of mounting of a different record medium when the different record medium is discriminated to be mounted.

These and other objects, features and advantages of the present invention will become more apparent upon a reading of the following detailed description and accompanying drawings.

BRIEF DESCRIPTION OF THE DRAWINGS

FIG. 3B being a front view thereof; FIG. 3C being a right side view thereof; and FIG. 3D being a bottom view thereof;

FIG. 4B is a block diagram showing a DAT recorder provided in the system;

FIG. 15 is a diagram showing an example of an index data;

DETAILED DESCRIPTION OF THE PREFERRED EMBODIMENT OF THE INVENTION

Figure 1:
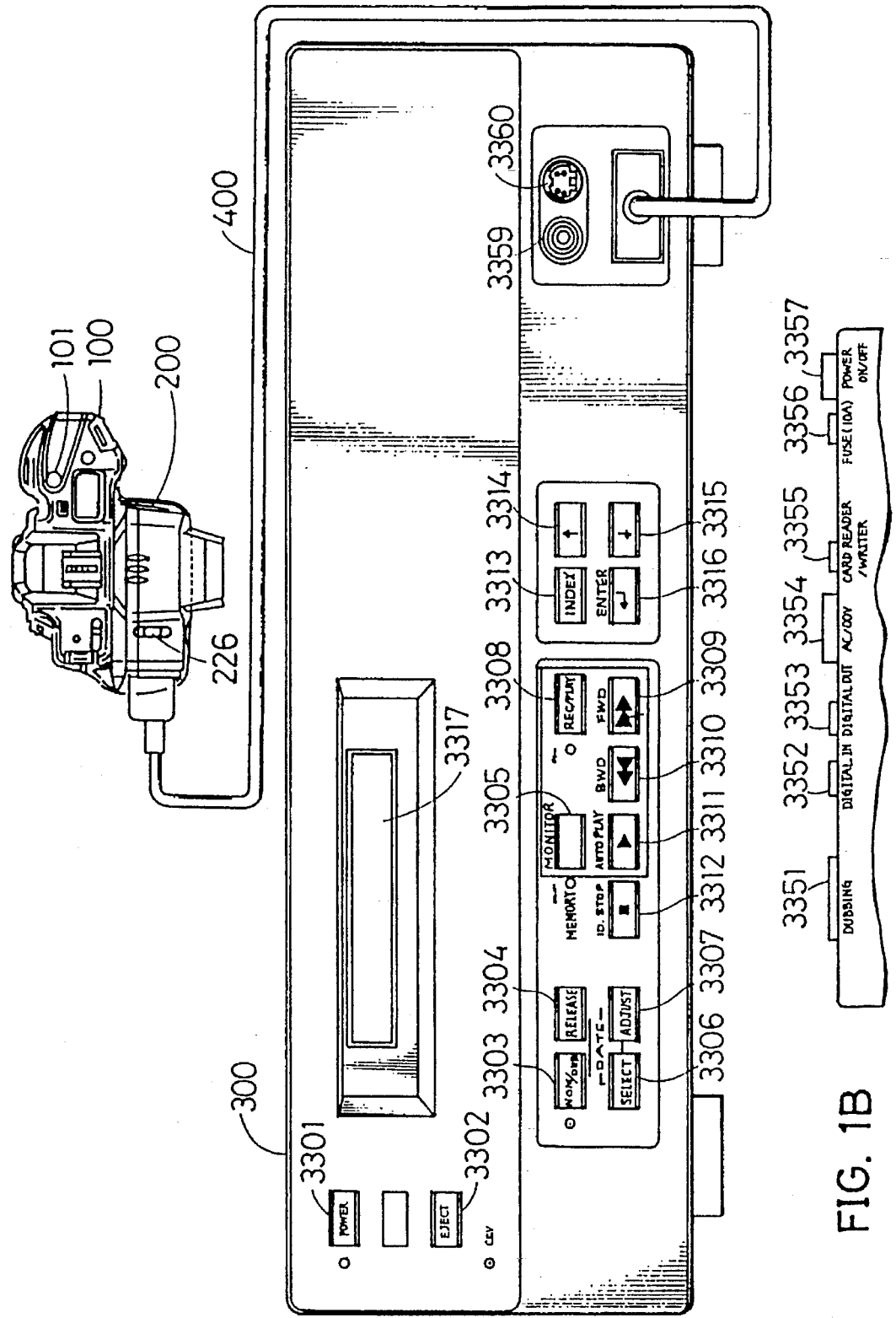
FIGS. 1A and 1B are diagrams showing an entire construction of a photographed image recording and reproducing system as a first embodiment of the invention, FIG. 1A being a conceptual diagram and FIG. 1B being a diagram showing terminals arranged at a back face of a DAT recorder.
Figure 2:
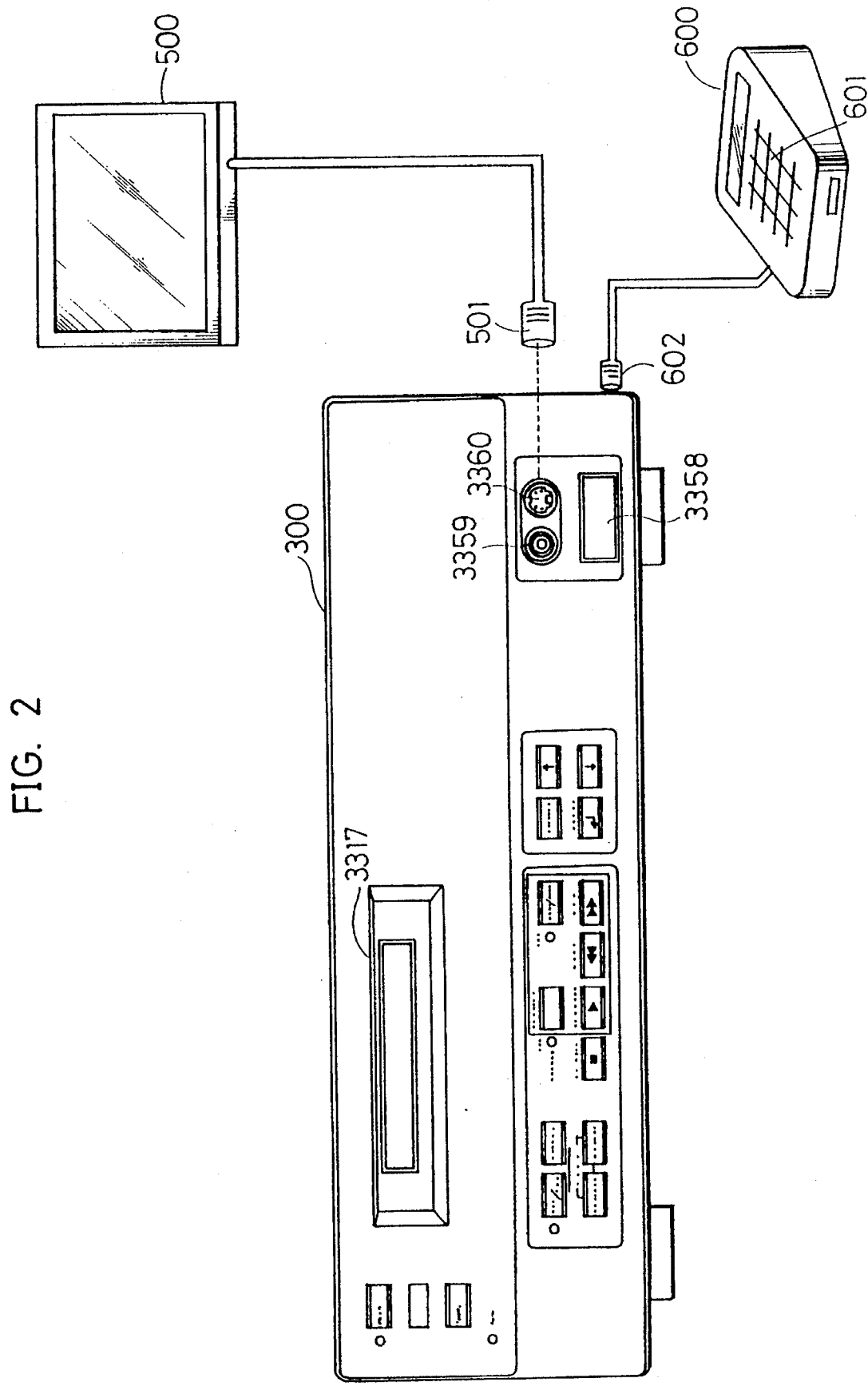
FIG. 2 is a diagram showing a state where optional devices are attached to the system shown in FIG. 1A.

FIG. 1A is a diagram showing an entire construction of a photographed image recording and reproducing system according to the invention; FIG. 1B shows terminals arranged at a back face of a DAT recorder 300; and FIG. 2 is a diagram showing a state where optional devices are attached to the system shown in FIG. 1A.

In FIG. 1A, indicated at 100 is a camera unit provided internally with an exposure control member and the like, and provided externally with a release button 101, and other control and operable members normally required for a photographing operation. At a rear portion of the camera unit 100 is mounted integrally or detachably an image pick-up device 200. The image pick-up device 200 is provided internally with a photoelectric conversion element such as a CCD and a signal processing unit, and is adapted for picking up an object image photographed by the camera unit 100 with the use of the CCD, and for outputting the picked up image in the form of an analog signal or a digital signal after applying a specified signal processing thereto. The image pick-up device 200 is also provided with a changeover switch 226 which is manipulated to perform a white balance (WB) correction. The camera unit 100 and the image pick-up device 200 constitute a still video camera.

Indicated at 300 is a digital audio tape (DAT) recorder which is externally connected to the image pick-up device 200 through a cable 400 and is adapted for recording the image signal output from the device 200 on a DAT. The DAT is mounted in a rolled state in a sheathed cassette. The DAT cassette is loaded in or ejected from the DAT recorder 300 through an insertion opening 3317 defined at a front face thereof. The DAT recorder 300 is also permitted to record, retrieve, and reproduce the image by manipulating various operable members arranged on a front panel of a remote controller 700 to be described later.

At the front face of the DAT recorder 300 are provided various operable members having the following functions.
[Description of Functions of POWER key 3301 to ENTER key 3316]

POWER key 3301: This key is manipulated to on/off the power supply. A green LED is lighted when this key is on.

EJECT key 3302: This key is manipulated to eject a cassette from the DAT recorder 300.

NORMAL/DUB 3303: This key is manipulated to change a normal mode to a dubbing mode, and vice-versa. A red LED is lighted in the dubbing mode.

RELEASE 3304: This key is manipulated to trigger an exposure operation, trigger the recording operation of an external input, and start the dubbing operation.

MONITOR 3305: This key is manipulated to change a memory frame to a through frame, and vice versa at the time of recording the external input. A green LED is lighted when the memory frame is output.

SELECT 3306: This key is manipulated to set a date adjustment mode and to select a column to be adjusted.

ADJUST 3307: This key is manipulated to increment a digit when a date is adjusted.

REC/PLAY 3308: This key is manipulated to change a record mode to a playback mode, and vice versa. A red LED is lighted in the record mode.

FWD 3309 (▸▸): This key is manipulated to feed images to be reproduced forward frame by frame. A frame number advances rapidly while this key is kept depressed, and thereafter the images are reproduced.

BWD 3310 (◂◂): This key is manipulated to feed images to be reproduced backward frame by frame. A frame number advances backward rapidly while this key is kept depressed, and thereafter the images are reproduced.

AUTO PLAY 3311 (▸): This key is manipulated to change an automatic feed mode to a manual feed mode, and vice versa. Frames of images are reproduced one by one every 5 seconds or so in the automatic feed mode. A direction of feed is changed when the FWD key or the BWD key is depressed in the automatic feed mode.

STOP 3312 (■): This key is manipulated to return to an ID input mode.

INDEX 3313: This key is manipulated to display an index screen. A list of ID numbers is displayed in the ID input mode while lists of frame numbers and dates are displayed in the playback mode.

UP 3314 (↑): This key is manipulated to move a cursor upwards in the index screen.

DOWN 3315 (↓): This key is manipulated to move the cursor downwards in the index screen.

ENTER 3316 (↵): This key is manipulated to confirm the input of the ID number and the frame number.

At the front face of the DAT recorder 300 are also provided a VIDEO OUT terminal 3359 for outputting the image signal to a monitor 500 and an S-terminal 3360. The monitor 500 is connected to the VIDEO OUT terminal 3359 or the S-terminal 3360 through a cable 501, and is used to reproduce the photographed image. Further, there is provided an external input terminal 3358 to which is connected a video camera (see FIG. 2). In the case where both the video camera and the camera unit 100 (image pick-up device 200) are connected to the terminal 3358, recording of the image signal from the camera unit 100 on the DAT is prioritized.

At the back face of the DAT recorder 300 shown in FIG. 1B are provided a dubbing terminal 3351, a digital IN terminal 3352, a digital OUT terminal 3353, an AC100V terminal 3354, a card reader/writer terminal 3355, a fuse (10A) mount member 3356, and a power on/off switch 3357. To the terminal 3351 is connected the other DAT recorder when the contents recorded on the DAT are dubbed. To the terminal 3352 is connected other image data input devices when other digital signals such as a facsimile image are read. To the terminal 3353 is connected a facsimile transmitter when a signal is transmitted. To the terminal 3354 is connected a plug extending from a commercial power supply. To the terminal 3355 is connected a card reader/writer 600.

The card reader/writer 600 is provided with a keyboard 601 as shown in FIG. 2 and is connected to the terminal 3355 through a cable 602. The card reader/writer 600 is used to record an ID code (identification information) on a magnetic card, an IC card, or like medium.

The remote controller 700 is adapted for inputting the ID code which serves as a retrieval information, etc. when a retrieval operation is carried out in the DAT recorder 300.

Figure 3A:
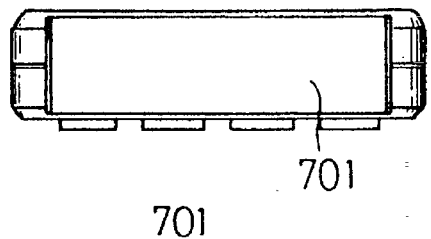
FIGS. 3A, 3B, 3C, and 3D are diagrams showing a construction of a remote controller, FIG. 3A being a plan view of the remote controller.
Figure 3B:
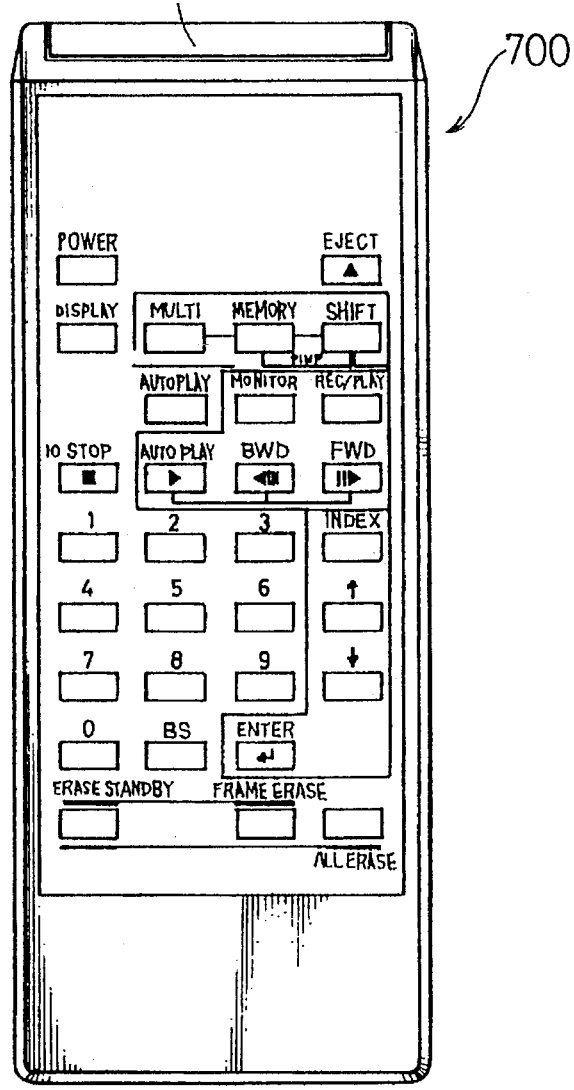
Figure 3C:
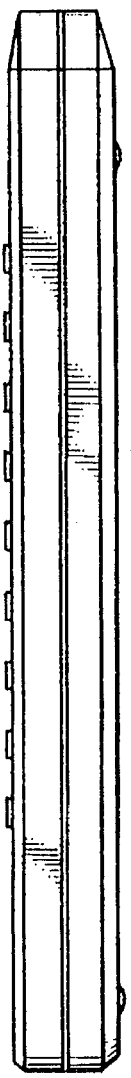
Figure 3D:

FIGS. 3A, 3B, 3C, and 3D are diagrams showing a construction of the remote controller 700, FIG. 3A being a plan view of the remote controller 700; FIG. 3B being a front view thereof; FIG. 3C being a right side view thereof; and FIG. 3D being a bottom view thereof.

As shown in these figures, at the front panel of the remote controller 700 are arranged various operable members including a POWER key to an ALL ERASE key, and numeric keys (ten keys). The functions of the POWER key to an ENTER key are the same as those provided at the front face of the DAT recorder 300. A DISPLAY key to the ALL ERASE key have the following functions.
[Description of Functions of DISPLAY key to ALL ERASE key]

DISPLAY: This key is manipulated to display on/off data (ID number, frame number, date) on the screen.

MULTI: This key is manipulated to change a display mode in an order of 1→4→9→PinP→1.

MEMORY: This key is manipulated to fix the screen in a multipicture mode.

SHIFT: This key is manipulated to shift the position of a sub-screen in a picture-in-picture mode.

BS: This key is manipulated to move an input cursor to the left so as to correct the input ID number.

NUMERIC KEYS: These keys are manipulated to input the ID number.

ERASE STANDBY: This key is depressed when the data is erased.

FRAME ERASE: This key is manipulated together with the ERASE key to erase one frame of image displayed on the screen.

ALL ERASE: This key is manipulated together with the ERASE key to erase all the frames of images under the same ID code.

The remote controller 700 is internally provided with means for generating an electrical signal corresponding to an operated content. A light emitting element which emits an optical signal in accordance with the electrical signal is arranged at a top end portion 701 of the remote controller 700 shown in FIGS. 3A and 3B. The light emitting element is designed to emit rays having a specific wavelength such as infrared rays in order to prevent the interference with external light.

Figure 4A:
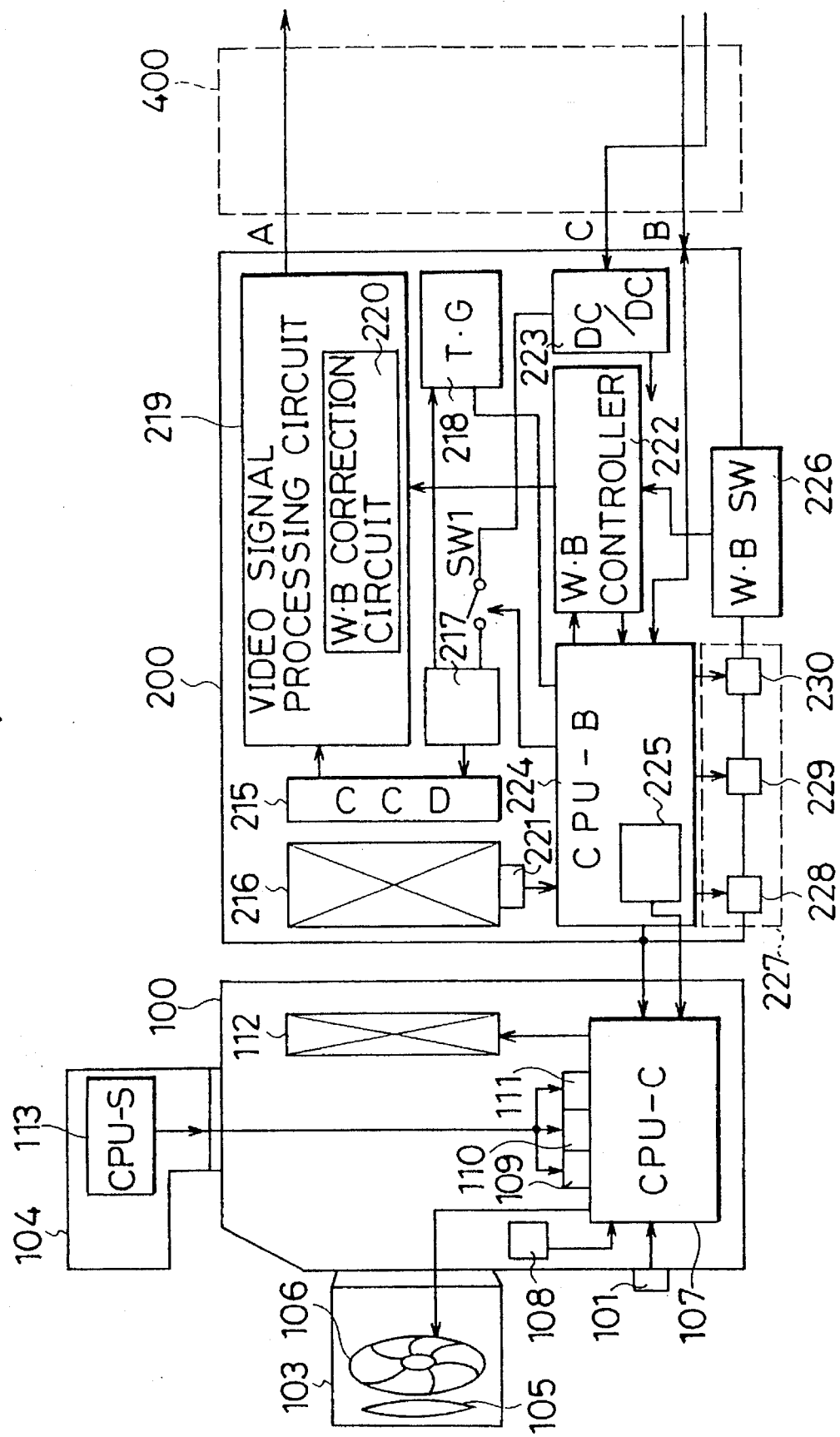
FIG. 4A is a block diagram showing a still video camera provided in the system according to the invention.

FIGS. 4A and 4B are block diagrams showing a construction of the photographed image recording and reproducing system. Specifically, FIG. 4B is a block diagram showing a construction of the still video camera and FIG. 4A is a block diagram showing a construction of the DAT recorder 300.

In FIG. 4A, indicated at 103 and 104 are an interchangeable lens and an electronic flash device (hereinafter referred to as a flash device), which are both mountable to the camera unit 100. The camera unit 100 includes a release button 101. Preparatory photographing operations such as detection of a focusing condition, light measurement, and WB correction are started when depressing the release button 101 halfway, and a shutter release operation is started when depressing the release button 101 all the way.

In the interchangeable lens 103 is defined an aperture 106 for controlling an amount of incident light transmitted through a taking lens 105. An opened amount of the aperture 106 is controlled by a control unit 107 (hereinafter referred to as a CPU 107) provided in the camera unit 100. The CPU 107 includes a microcomputer, and controls an exposure control operation of the camera unit 100. In the flash device 104 is provided a control unit 113 (hereinafter referred to as a CPU 113) including a microcomputer. The CPU 113 controls the charging, a light emitting timing, an amount of light to be emitted, and other operations of the flash device 104.

The camera unit 100 are also provided internally with a light measuring sensor 108 and a shutter device 112 consisting essentially of a focal plane shutter. The sensor 108 includes, for example, an SPC (Silicon PhotoCell) and is adapted for measuring an amount of light incident upon the interchangeable lens 103. Further, the release button 101 is provided in a specified position at an exterior of the camera unit 100. The CPU 107 is provided with a flash detector 109 for detecting that the flash device 104 is mounted, a mounted flash detector 110 for detecting the type of the mounted flash device 104, and charging detector 111 for detecting whether the charging of the flash device 104 has been completed.

A light measurement data obtained by the light measuring sensor 108 is input to the CPU 107, which in turn calculates an exposure control value (a control aperture value and a control shutter speed) based on the light measurement data and a sensitivity information input from a control unit 224 (hereinafter referred to as a CPU 224) provided in the image pick-up device 200. The CPU 107 sets the opened amount of the aperture 106 at the control aperture value. Upon instruction of the shutter release operation by means of the release button 101, the CPU 107 drives the shutter device 112 at the control shutter speed to carry out the photographing operation. It should be noted that the shutter release operation may be started by manipulating a release button 346 (to be described later) provided on the DAT recorder 300.

When the flash device 104 is mounted, the CPU 113 in the flash device 104 transfers to the CPU 107 data concerning the mounting of the flash device, the type of the flash light to be emitted, completion of the charging, and the like. The CPU 107 makes various detections based on the received data using the flash detector 109, the mounted flash detector 110, and the charging detector 111.

In the image pick-up device 200 are provided a color photoelectric conversion element (hereinafter referred to as a CCD) 215, a relay lens system 216, a drive control circuit 217, a timing signal generator 218 for generating a timing signal, and a video signal processing circuit 219. The CCD 215 picks up an object image by photoelectrically converting the same into an electric signal. The relay lens system 216 introduces the object image to the CCD 215. The drive control circuit 217 controls the driving of the CCD 215. The video signal processing circuit 219 applies a specified processing to the signal picked up by the CCD 215.

The drive control circuit 217 generates a drive control signal in accordance with the timing signal input from the timing signal generator 218, and sends the generated signal to the CCD 215 so as to control the same. In accordance with the drive control signal, the CCD 215 stores electric charges (picks up an image) and outputs the stored electric charges (the photographed image signal) to the video signal processing circuit 219. The processing circuit 219 applies the specified processing to the input image signal (analog signal) so as to generate a luminance signal Y and color difference signals (R-Y), (B-Y), and further generates a composite video signal to be output to the DAT recorder 300 based on the luminance signal Y and the color difference signals (R-Y), (B-Y).

In the video signal processing circuit 219 is provided a WB (White Balance) correcting circuit 220, which applies the WB correction to the image signal.

In the image pick-up device 200 are also provided a light measuring sensor 221, a WB controller 222, a direct current/direct current (DC/DC) converter 223, and the CPU 224. The light measuring sensor 221 includes, for example, an SPC, and is adapted for receiving a portion of light passing through the relay lens system 216 or the light reflected by the CCD 215 and for measuring an amount of the received light. The WB controller 222 controls the white balance according to the color temperature of a light source. The DC/DC converter 223 supplies power to respective circuits in the image pick-up device 200. The CPU 224 controls an image pick-up operation of the image pick-up device 200. In the CPU 224 is provided a sensitivity setting circuit 225 for setting the sensitivity of the image pick-up device 200. This circuit 225 generates the sensitivity information according to the type of the light source and outputs the generated information to the CPU 107 in the camera unit 100. An operation of the circuit 225 will be described more in detail later.

The DC/DC converter 223 receives the power supplied thereto from a power supply 345 provided in the DAT recorder 300, and generates from the supplied power specified dc voltages according to the circuits to which the voltages are fed. A switch is provided between the DC/DC converter 223 and the drive control circuit 217. The switch SW1 is controllably turned on and off so as to control the supply of power to the drive control circuit 217. The CPU 224 controls the driving of the drive control circuit 217, i.e. the image pick-up operation by means of the CCD 215, by controllingly turning on and off the switch SW1.

On the exterior of the image pick-up device 200 is provided a WB switch 226 for inputting information of respective light sources (hereinafter referred to as light source information) such as A (tungsten lamp), FL (fluorescent lamp), and F (daylight). The light source information set by means of the WB switch 226 is input to the WB controller 222. Based on the light source information, the WB controller 222 performs the WB correction, and the sensitivity information is generated in the sensitivity setting circuit 225.

Figure 5:
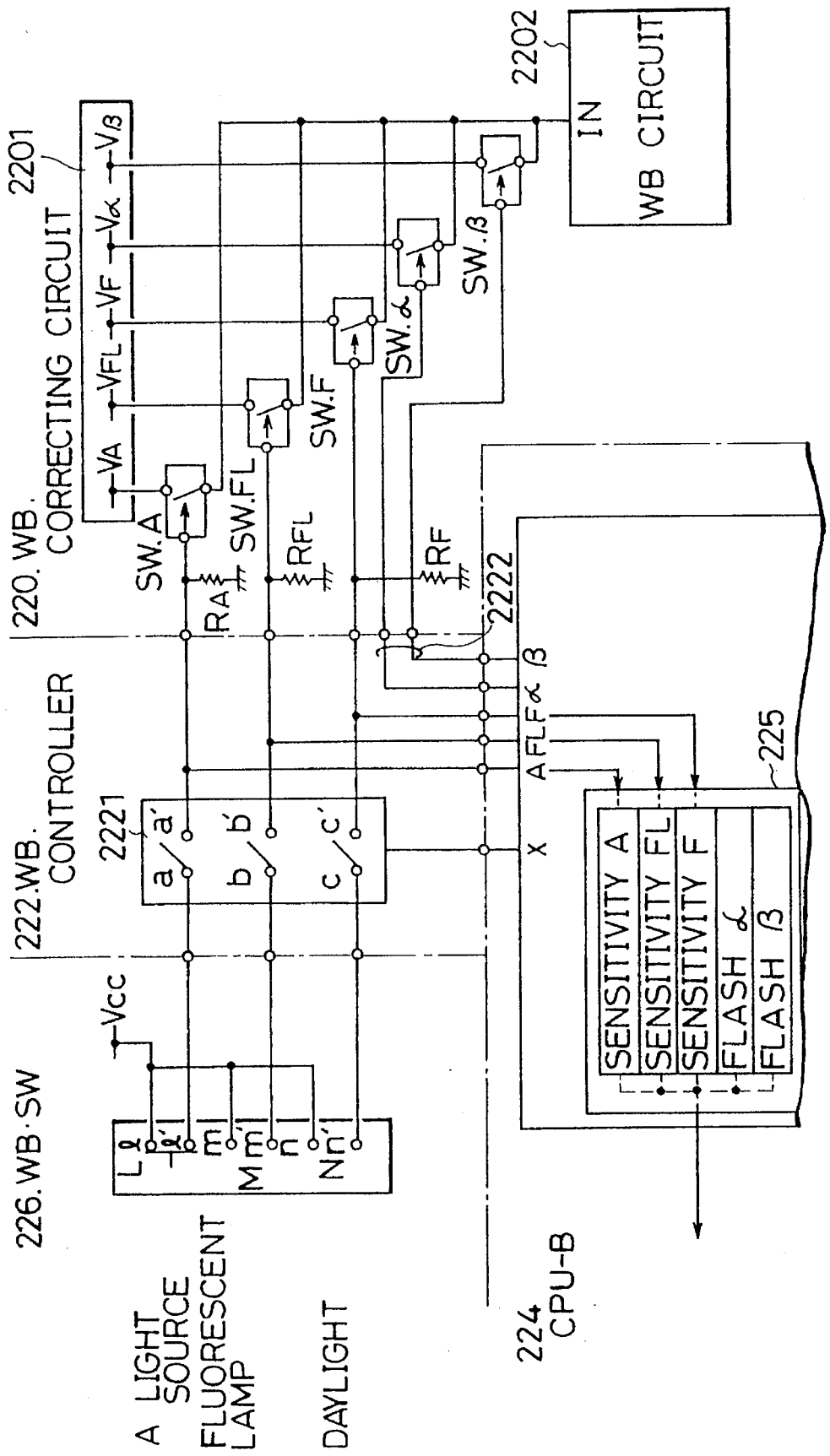
FIG. 5 is a diagram showing a circuit construction of a white balance controller and its peripheral circuits in the system.

FIG. 5 is a diagram showing a circuit construction of the WB controller 222 and peripheral circuits thereof.

The WB switch 226 is a switch including three switches L, M, and N and adapted for setting three states. The light source information of A, FL, or F is switchably set by, for example, sliding an operable button to change the respective states of the switches L, M, and L. Contacts l, m, and n of the respective switches L, M, and N are connected to a Vcc voltage supply supplied from the DC/DC converter 223, while the other contacts l', m', and n' thereof are connected to contacts a, b, and c of switches 2221 provided in the WB controller 222.

The WB controller 222 controls the transfer of the light source information set by means of the WB switch 226 to the WB correcting circuit 220 and the CPU 224, and includes the switches 2221 and control lines 2222. Contacts a', b' and c' corresponding to the contacts a, b, and c of the switches 2221 are connected to an A-terminal, an FL-terminal, and an F-terminal of the CPU 224, and also to control terminals of a switch SW.A, a switch SW.FL, and a switch SW.F provided in the WB correcting circuit 220 respectively. The switches 2221 are controllably turned on and off in accordance with a control signal input from an X-terminal of the CPU 224.

The CPU 224 turns all the switches 2221 on if the flash device 104 has not been completely charged yet. On the other hand, the CPU 224 turns all the switches 2221 off so as to apply the WB correction according to the color temperature of the light emitted from the flash device 104 if the flash device 104 has been completely charged.

The control lines 2222 are adapted for sending therethrough to the WB correcting circuit 220 a control signal representative of the type of the mounted flash device 104 which is output from the CPU 224. In this embodiment, two types of flash devices 104, namely a flash device α and a flash device β, are mountable to the camera unit 100. The control signals are sent from an α-terminal and a β-terminal of the CPU 224 to control terminals of a switch SW.α and a switch SW.β provided in the WB correcting circuit 220. These control signals are sent when the charging of the flash device 104 is completed. For example, a high level signal is sent from the α-terminal in the case where the flash device α is mounted, whereas a high level signal is sent from the β-terminal in the case where the flash device β is mounted.

In the sensitivity setting circuit 225 within the CPU 224 are preset the sensitivities according to the light sources A, FL, F, flash device α, and flash device β. Based on the light source information input from the WB controller 222 or the information on the type of the mounted flash device 104 (hereinafter referred to as a mounted flash information) detected by the mounted flash detector 110, the circuit 225 outputs the sensitivity information of the corresponding light source to the CPU 107 of the camera unit 100. The transfer of the sensitivity information is carried out during an S-communication between the camera unit 100 and the image pick-up device 200 to be described later.

The WB correcting circuit 220 includes a voltage supply circuit 2201, a WB circuit 2202, and switches SW.A, SW.FL, SW.F, SW.α, SW.β. The voltage supply circuit 2201 outputs control voltages according to the light source. The WB circuit 2202 sets a specified WB correction value according to the voltage applied to an IN terminal thereof. The switches SW.A to SW.β are designed to apply only the voltages corresponding to the set light source to the IN terminal of the circuit 2202 out of the voltages output from the circuit 2201.

In the voltage supply circuit 2201 are preset specified values of voltages Va, Vfl, Vf, Vα, and Vβ corresponding to the respective light sources A, FL, F, flash device α, and flash device β. These voltages are output through specified output terminals. One of each pair of contacts of the switches SW.A to SW.β is connected to the corresponding output terminal of the voltage supply circuit 2201, while the other is connected to the IN terminal of the WB circuit 2202.

To the control terminals of the switches SW.A to SW.β are fed the control signals from the CPU 224 through the WB switch 226 and the WB controller 222. Upon receipt of high level control signals, the switches SW.A to SW.β are turned on, and thereby the specified voltage corresponding to the color temperature of the light emitted from the light source set by the WB switch 226 or the mounted flash device 104 is applied to the IN terminal of the WB circuit 2202. For example, in the case where the light source A is set by the WB switch 226 and the switch L is in the ON state, the voltage Vcc is applied to the control terminal of the switch SW.A if the flash device 104 has not been completely charged yet. Thereupon, the switch SW.A is turned on, and the voltage Va is applied to the IN terminal of the WB circuit 2202. At this time, the switches M, N of the WB switch 226 are in the OFF states, and the control terminals of the switches SW.FL, SW.F are grounded through resistors Rfl, Rf. Further, the α-terminal and the β-terminal of the CPU 224 are in the low level, and the switches SW.FL, SW.F, SW.α, and SW.β are all in the respective OFF states. Accordingly, the voltages Vfl, Vf, Va, and Vβ are not applied to the IN terminal of the WB circuit 2202.

Figure 6:
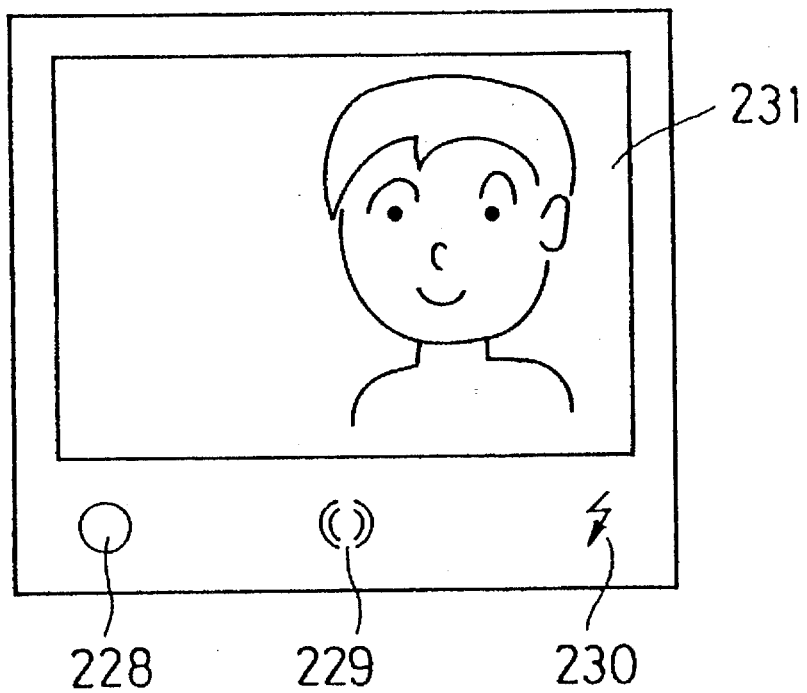
FIG. 6 is a diagram showing a display unit provided in a viewfinder of the still video camera.

As shown in FIG. 6, also, there are provided on a lower portion of a display screen 231 in the viewfinder 227 a shutter release indicator 228 for indicating a shutter release prohibiting state, an in-focus condition indicator 229 for indicating a state where an in-focus condition is attained, and a charging completion indicator 230 for indicating a charging completion state. The above states are indicated by lighting marks symbolizing those or by changing the color of the lighting. The shutter release prohibiting state is indicated when the indicator 228 is lighted off, while a shutter release enabling state is indicated when the indicator is lighted on. An out-of-focus condition is indicated when the indicator 229 is lighted in red, while the in-focus condition is indicated when the indicator 229 is lighted in green. The indicator 230 lighted in red indicates that the flash device 104 has been completed charged.

There will be described a circuit construction within the DAT recorder 300 next.

In FIG. 4B, indicated at 331 is an analog-to-digital (A/D) converter, and at 332 a memory. The A/D converter 331 A/D converts the image signal from the video signal processing circuit 219 of the image pick-up device 200. The memory 332 functions as a buffer for temporarily storing a digital image signal input from the A/D converter 331, or through the digital IN terminal 3352 or the dubbing terminal 3351. The memory 332, having a capacity of storing two frames of images, includes a first frame memory and a second frame memory. The image signal may be input to a signal compression/expansion means before or after A/D converted according to needs.

Indicated at 333 is a memory controller for sending an address which is used to write the image signal in the memory 332 or to read it therefrom. Indicated at 334 is a CPU for administering information concerning contents of the recorded files of the PAT (index data) and centrally controls an overall operation of the DAT recorder 300 according to the index data and data input externally.

Indicated at 335 is a first decoder, at 337 a second decoder, and at 339 an interface. The first decoder 335 decodes data input through a keyboard 336 serving as an operation unit of the DAT recorder 300 and inputs the decoded data to the CPU 334. The second decoder 337 decodes a signal from a light receiver 338 for receiving the optical signal representative of data input through the remote controller 700, and inputs the decoded data to the CPU 334. The interface 339, which is fabricated in accordance with the RS232C specification, decodes data input from the optional card reader/writer 600, and inputs the decoded data to the CPU 334.

Figure 7:
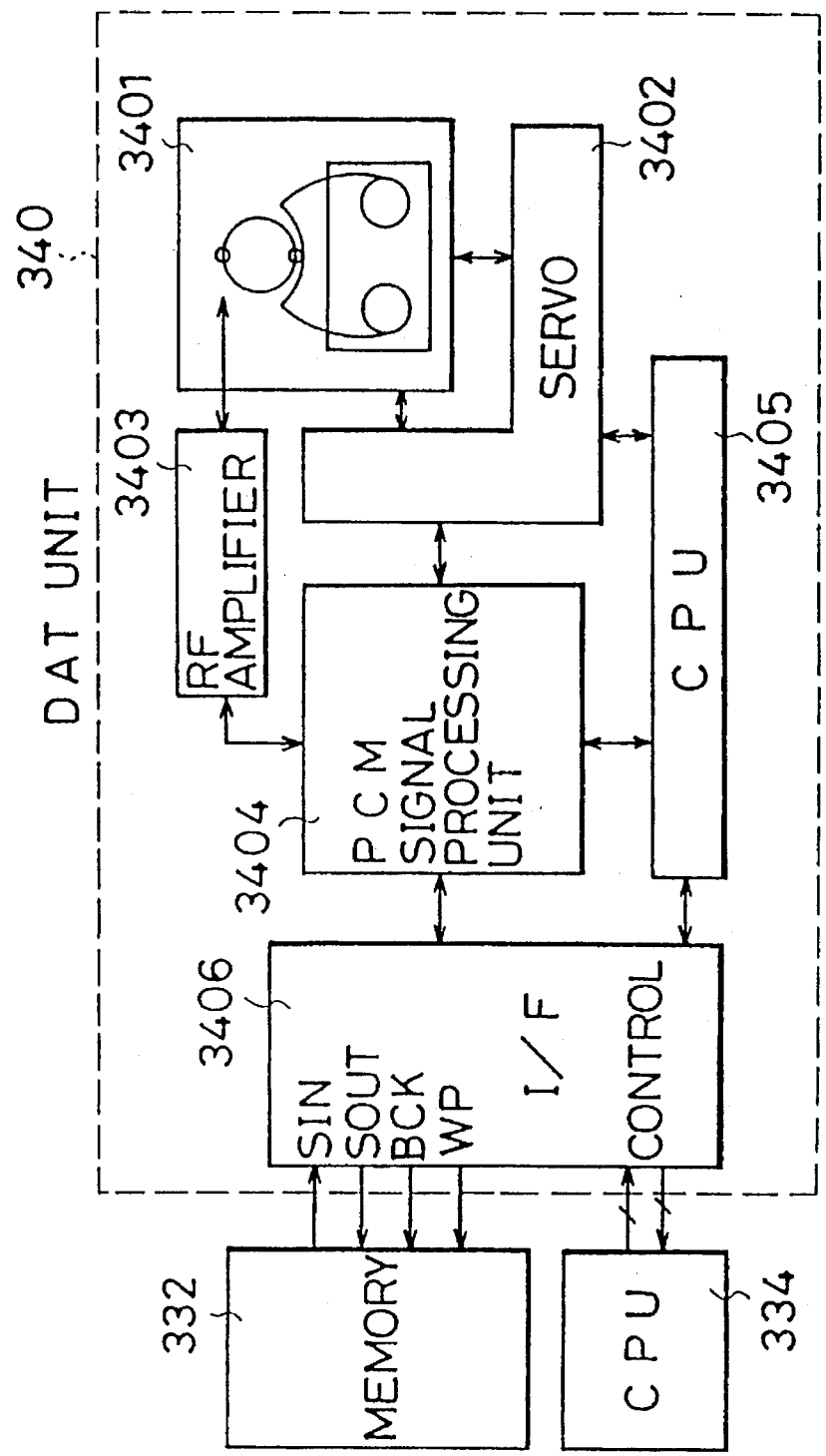
FIG. 7 is a block diagram showing a construction of a DAT unit in the DAT recorder.

Indicated at 340 is a DAT unit for directly driving the DAT detachably loaded in the DAT recorder 300 through the insertion opening 3317. As shown in FIG. 7, the unit 340 is provided with a deck unit 3401, a servo unit 3402, an RF amplifier 3403, a signal processing unit 3404 in accordance with the format of the DAT, a CPU 3405, and an interface 3406. The deck unit 3401 includes a magnetic head for writing and reading the data in and out of the DAT, a drive motor for causing the DAT to run, etc. The servo unit 3402 is adapted for stabilizing the run of the DAT. The CPU 3405 controls the driving of the above elements in accordance with a control signal from the CPU 334 and operations of writing and reading in and out of the DAT. The interface 3406 is provided so as to enable the DAT unit 340 to communicate with the memory 332 and CPU 334.

The interface 3406 includes a serial data input/output portion, a parallel data input/output portion, and a power supply portion. Four kinds of signals, namely SIN, SOUT, BCK and WP are sent between the memory 332 and the serial data input/output portion of the interface 3406.

Figure 8:
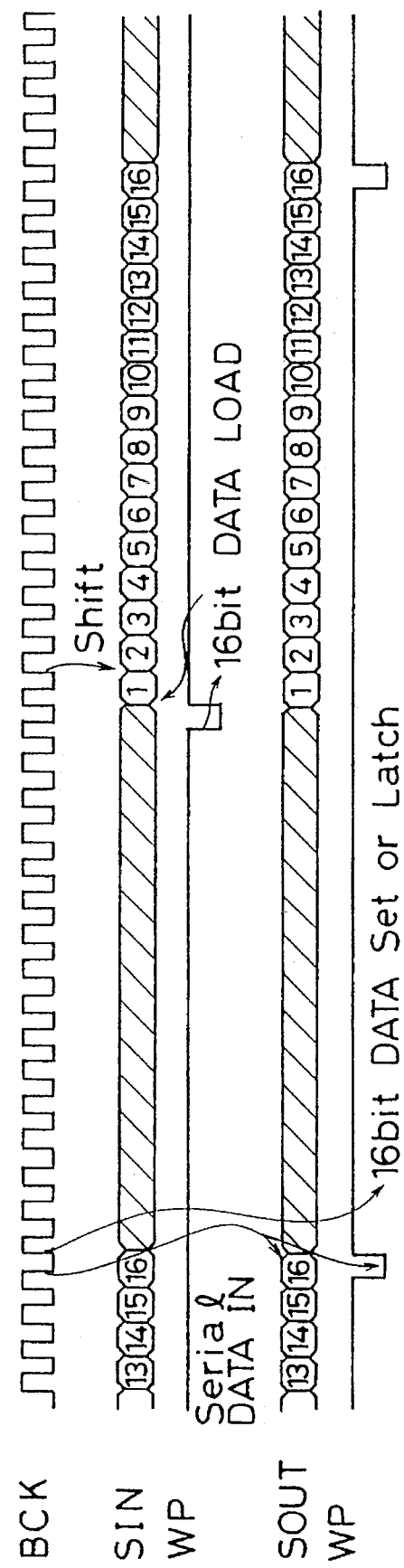
FIG. 8 is a diagram showing examples of control signals.

FIG. 8 shows waveforms of the above four signals when they are sent. The SIN signal is representative of serial data which is input to the DAT unit 340 from the memory 332 and which is recorded on the DAT. The SOUT signal is representative of serial data which is read out of the DAT and which is output to the memory 332 from the DAT unit 340. The BCK signal is a reference clock signal which is used to transmit the SIN and the SOUT signals and which is sent from the DAT unit 340. The WP signal is a pulse which is output every 16 bits of the SIN and the SOUT signals from the DAT unit 340.

A command signal and a result code signal, both consisting of 8 bits, are sent between the CPUs 3405 and 334 through the parallel data input/output portion of the interface 3406. The command signal is representative of a command input from the CPU 334 to the CPU 3405. The commands represented by the command signals includes those listed in TABLE-1 below. Further, the result code signal is signal corresponding to the command signal and is sent from the CPU 3405 to the CPU 334.

TABLE 1

| NUMBER | CONTENT OF COMMAND |
| --- | --- |
| 1 | Check the presence of the cassette tape in a cassette deck. |
| 2 | Eject the cassette tape. |
| 3 | Format a designated number of units following the present unit. |
| 4 | Read out one unit of data. |
| 5 | Transfer a sub-code read by the command No. 4 to a host. |
| 6 | Initialize a system of the DAT unit. |
| 7 | Set the magnetic head at a leading end of the designated unit. |
| 8 | Rewind the tape up to BOT. |
| 9 | Receive the sub-code to be recorded from the host when a command No. 10 is given. |
| 10 | Record the data for one unit. |
| 11 | Demand a status of the DAT unit. |
| 12 | Read the designated number of units continuously. |
| 13 | Format units 0 to a designated number. |
| 14 | Transfer the position of the unit after the running of the tape is stopped. |

TABLE 1-continued

| NUMBER | CONTENT OF COMMAND |
| --- | --- |
| 15 | Transfer a write detection switch and a cassette-in switch information. |
| 16 | Record a file end mark after recording one unit of data. |
| 17 | Reformat a defective unit. |
| 18 | Format one unit continually after a last unit, and record the data at the same time. |
| 19 | Transfer information on the length of the cassette tape. |
| 20 | Transfer an accumulated tape loading time following a last cleaning operation. |
| 21 | Transfer the accumulated tape loading time. |
| 22 | Transfer dewing information. |

Referring back to FIG. 4B, indicated at 341 a multi-signal processing unit for applying a specified processing to the recorded image signal so as to make it reproducible on the multipicture screen. This unit 341 is utilized when the last photographed image and the instant photographed image are compared or at other occasions. The multipicture screen has a picture combining function, and there are provided three multipicture modes:

1) a picture-in-picture mode (PinP mode) in which a small picture is displayed in a window-like sub-screen at one of four corner portions of a monitor screen on which another picture is displayed;

2) a four picture mode in which the entire monitor screen is divided along horizontal and vertical center lines, and thereby four pictures can be displayed on the screen; and 3) a nine picture mode in which the entire monitor screen is divided horizontally and vertically into three, and thereby nine pictures can be displayed on the screen.

Indicated at 342 is a digital-to-analog (D/A) converter, at 343 an encoder, and at 344 a character generator. The encoder 343 converts the recorded image signal into a standard television signal such as an NTSC signal by adding a burst signal, horizontal and vertical synchronizing signals so as to make it reproducible on television. The character generator 344 is adapted for generating characters and graphics and superimposing the generated characters and graphics within a reproduced picture screen. The output from the character generator 344 is input to the monitor 500 shown in FIG. 2 through the VIDEO OUT terminal 3359 or the S-terminal 3360.

Indicated at 345 is a power supply unit for generating voltages of desired levels from the commercial power supply, and supplying power to various circuits in the DAT recorder 300 and also to the DC/DC converter 223.

A normal photographing operation of the still video camera will be described next with reference to a timing chart shown in FIG. 9. First of all, contents of respective signals are described below.

S1: This is a signal representative of a state of an S1 terminal of the CPU 107. When the release button 101 is depressed halfway, the level of the S1 terminal of the CPU 107 falls to low, and thereby the CPU 107 starts the preparatory photographing operation such as the light measurement, the detection of the focusing condition, the focusing, and the setting of the exposure control value.

S2: This is a signal representative of a state of an S2 terminal of the CPU 107. When the release button 101 is depressed all the way, the level of the S2 terminal of the CPU 107 falls to low, and thereby the CPU 107 drives the shutter device 112 so as to conduct the photographing operation upon completion of the light measurement, detection of the focusing condition, and focusing.

CSBCK: This is a signal representative of a communication state between the CPU 107 of the camera unit 100 and the CPU 224 of the image pick-up device 200. S-sections in a waveform of this signal indicate that the camera unit 100 is performing the light measurement, detection of the focusing condition, and focusing (hereinafter referred to as a S-communication). A D-section in the waveform of this signal indicates that the camera unit 100 has entered an operation sequence of releasing the shutter device 112 (hereinafter referred to as a D-communication). An SS-section in the waveform of this signal indicates that the camera unit 100 is executing a control to open the shutter device 112 by sending drive control signals 1CMG, 2CMG to be described later (hereinafter referred to as a SS-communication). The shutter device 112 includes a focal plane shutter. The opening period of the shutter device 112 is a period between the start of travel of a front blind and the start of travel of a rear blind. This opening period corresponds to a shutter speed.

1CMG: This is a drive control signal sent from the CPU 107 of the camera unit 100 to the shutter device 112 so as to control the travel of the front blind of the focal plane shutter. Upon the fall of this signal, the charging of the front blind is started. Upon the rise of this signal, the travel of the front blind is started.

2CMG: This is a drive control signal sent from the CPU 107 of the camera unit 100 to the shutter device 112 so as to control the travel of the rear blind of the focal plane shutter. Upon the fall of this signal, the charging of the rear blind is started. Upon the rise of this signal, the travel of the rear blind is started.

SS: This waveform shows an actual operating state of the shutter device 112. This waveform indicates a stand-by state of the shutter device 112 when being in the low level. A slanting portion in this waveform indicates a traveling state of the front and rear blinds. Further, a T-section of this waveform indicates an opened state of the shutter device 112.

RCRDY: This is a shutter release prohibition signal which is sent from the CPU 334 of the DAT recorder 300 to the CPU 224 of the image pick-up device 200. When the record mode is not set in the DAT recorder 300, the high level RCRDY signal is sent so as to prohibit the recording of the image data. When the record mode is set, the RCRDY signal is inverted to the low level so as to release a photography prohibiting state.

DTRL.S: This is a photography prohibition signal which the CPU 224 of the image pick-up device 200 sends to the CPU 107 of the camera unit 100 upon receipt of the RCRDY signal. The photographing operation is prohibited while this signal is in the high level.

S2D: This is a control signal which is sent from the CPU 224 of the image pick-up device 200 to the CPU 334 of the DAT recorder 300 so as to bring the memory 332 of the DAT recorder 300 into a write enabling state.

PWCTL: This is a control signal in accordance with which the switch SW1 is turned on and off. The switch SW1 is turned on when this signal is in the high level, and power is supplied to the drive control circuit 217 of the CCD 215 from the DC/DC converter 223, thereby starting the driving of the CCD 215.

FLD: This is a synchronizing signal generated by the timing signal generator 218. The frequency of this signal is same with a frame frequency. Accordingly, a high period during which this signal is in the high level and a low period during which this signal is in the low level in one cycle respectively correspond to a time it takes for the CCD 215 to store electric charges for one field of image. In accordance with this synchronizing signal, it is discriminated which field of image is being picked up. More specifically, if the electric charges for a first field are stored during the low period in one cycle, and if those for a second field are stored during the high period in on cycle, the field of image being picked up can be discriminated by discriminating the level of the synchronizing signal.

RDST: This is control signal for prohibiting the sending of a field shift signal from the timing signal generator 218 to the drive control circuit 217. The field shift signal is used to control the reading of the electric signal representative of the stored electric charges from the CCD 215. By stopping the sending of the field shift signal, the reading of the electric signal from the CCD 215 is prohibited. The sending of the field shift signal is stopped when this signal is in the high level.

RCGT: This is a signal which is sent from the CPU 224 to the CPU 334 so as to start writing the photographed image data in the memory 332.

TD: This is a signal which indicates that the DAT unit 340 of the DAT recorder 300 is in an operating state and which is sent from the CPU 334 to the CPU 224. The DAT unit 340 is in the operating state when this signal is in the high level.

Figure 9:
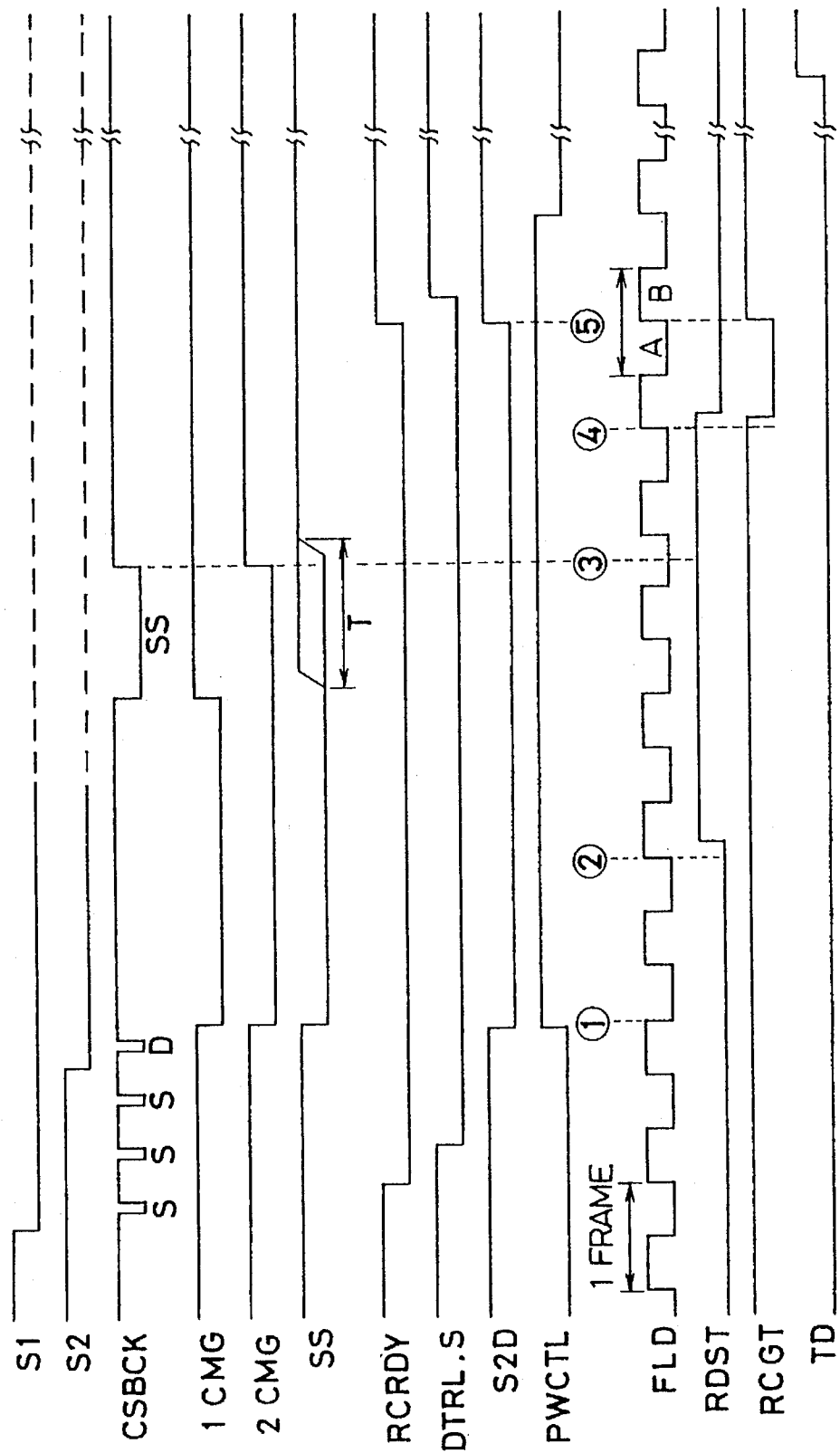
FIG. 9 is a timing chart showing a shutter release timing in a normal photographing operation of the still video camera.

In FIG. 9, when the level of the S1 signal falls to low upon depression of the release button 101 halfway, the CPU 107 conducts the S-communication with the CPU 224 and starts the various operations such as the light measurement, the detection of the focusing condition, and the focusing. Through the S-communication, the sensitivity information is transferred from the sensitivity setting circuit 225 in the CPU 224 to the CPU 107. When the DAT recorder 300 enters the record mode, the CPU 334 inverts the release prohibition signal RCRDY, which is sent from the CPU 334 to the CPU 224, from the high level to the low level, thereby releasing the shutter release prohibiting state. Upon receipt of the signal RCRDY, the CPU 224 causes the shutter release indicator 228 in the viewfinder 227 to emit the green light, thereby informing an operator that the camera unit 100 is in the shutter release enabling state. Further, the CPU 224 inverts the photography prohibition signal DTRL.S from the high level to the low level, thereby releasing the photography prohibiting state.

When the release button 101 is pressed all the way with the shutter release prohibiting state released, and the level of the S2 signal falls to low, the CPU 107 discriminates whether the focusing has been properly performed so as to attain an in-focus condition. If the focusing has been properly performed, the CPU 107 causes the in-focus condition indicator 229 within the viewfinder 227 to emit the green light, thereby informing the operator that the camera unit 100 has attained the in-focus condition. In addition, the CPU 107 starts the charging of the front and the rear blinds, thereby bringing the shutter device 112 into a stand-by state.

The CPU 107 informs the CPU 224 that the charging of the front and rear blinds has been started through the D-communication. Upon receipt of this information, the CPU 224 sends the low level S2 signal to the CPU 334 so as to bring the memory 332 into the write enabling state. Further, the CPU 224 sends the high level PWCTL signal to the switch SW1 to turn on the same. Thereby, the DC/DC converter 223 supplies the power to the drive control circuit 217 so as to cause the CCD 215 to start the image pick-up operation. Further, the CPU 224 sends the high level RDST signal to the drive control circuit 217 in synchronism with a second rise of the FLD signal (at a timing ②) after the sending of the PWCTL signal (following a timing ①), thereby prohibiting the reading of the electric signal representative of the stored charges from the CCD 215.

Thereafter, the CPU 224 conducts the SS-communication with the CPU 107, which in turn drives the shutter device 112 so as to execute an exposure control. The CPU 107 inverts the 1CMG signal from the low level to the high level to cause the front blind to start traveling. After lapse of a specified period following the inversion of the 1CMG signal, the CPU 107 inverts the 2CMG signal from the low level to the high level to cause the rear blind to start traveling.

After completion of the SS-communication (at a timing ③), the CPU 224 stops the sending of the RDST signal to the drive control circuit 217 in synchronism with the first or second rise of the FLD signal (at a timing ④) thereafter, thereby releasing the state of prohibiting the reading of the electric signal from the CCD 215. In addition, the CPU 224 sends the low level RCGT signal to the CPU 334 so as to instruct the start of recording the photographed image. Thereupon, the electric signal is read out to the video signal processing circuit 219 in accordance with the field shift signal sent from the drive control circuit 217.

In FIG. 9, a portion of the electric signal representative of the stored electric charges for the first field of image are read during the low period (A period) of the FLD signal after the timing ④. The remaining portion of the electric signal representative of the stored electric charges for the second field of image are read during the high period (B period) of the FLD signal. The read electric signal has a specified signal processing applied thereto by the video signal processing unit 219, and is output to the DAT recorder 300 to be stored in the memory 332. As described above, a WB correction value according to the type of the light source is set in the WB circuit 2202 provided in the WB correcting circuit 220, and therefore a suitable WB correction according to the type of the light source is performed during the above signal processing.

The CPU 224 stops the sending of the RCGT signal and the S2D in synchronism with the rise of the FLD signal (at a timing ⑤ of reading the electric signal). On the other hand, the CPU 334 sends the RCRDY signal to the CPU 224, which in turn sends the DTRL.S signal to the CPU 107 so as to prohibit the shutter release operation.

The image data stored in the memory 332 is recorded on the DAT loaded in the DAT unit 340. During this recording operation, the TD signal is sent from the CPU 334 to the CPU 224. The RCRDY signal is sent from the CPU 334 to the CPU 224 until this recording operation is completed. After the sending of the TD signal is stopped, the record mode ends.

The above photographing operation is carried out by operating the release button 101 of the camera unit 100. However, the photographing operation may be remotely conducted by operating the release button 346 provided on the DAT recorder 300 or by controlling a personal computer 800 shown in FIG. 4B.

Figure 10:
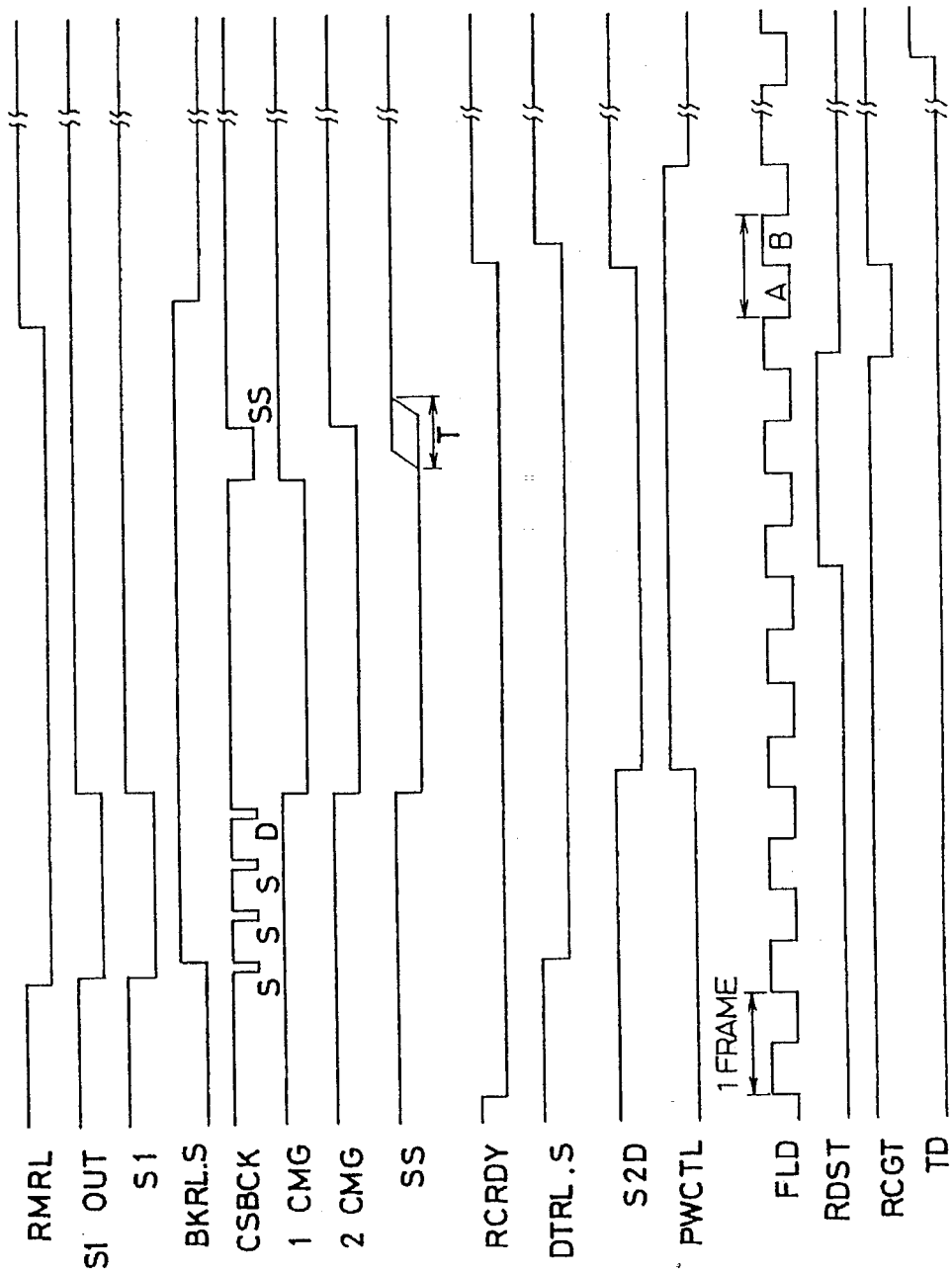
FIG. 10 is a timing chart showing the shutter release timing in a remotely controlled photographing operation of the still video camera.

FIG. 10 is a timing chart showing the shutter release timing in a remotely controlled photographing operation of the still video camera.

FIG. 10 is identical to FIG. 9 except that the S2 signal is deleted therefrom, and an RMRL signal, an S1OUT signal, and a BKRL.S signal are added thereto. The signals listed in FIG. 10 excluding the above added signals operate in the same way as those listed in FIG. 9 in the photographing operation. Accordingly, no description is given to those signals here.

The RMRL signal is a shutter release command signal which the CPU 334 sends to the CPU 224 upon receipt of a command signal to start the shutter release sent through operation of the release button 346 or from the personal computer 800. The S1OUT signal is a control signal which is sent from the CPU 224 to the CPU 107 so as to cause the CPU 107 to generate the S1 signal. The CPU 107 inverts the level of the S1 terminal from high to low upon receipt of the S1OUT signal from the CPU 224, thereby starting the preparatory photographing operation. The BKRL.S signal is a signal corresponding to the S2 signal shown in FIG. 9.

In the remotely controlled photographing operation, the sending of the RCRDY signal from the CPU 334 to the CPU 224 is first stopped, and the shutter release prohibiting state is released. Thereafter, when the release button 346 is operated, or when a shutter release start signal is input to the personal computer 800, the CPU 334 sends the RMRL signal to the CPU 224. Upon receipt of the RMRL signal, the CPU 224 sends the S1OUT signal and the BKRL.S signal to the CPU 107, and thereby the shutter release operation is started. The photographing operation which follows thereafter will not be described since it is similar to the photographing operation described above.

In a state where the RCRDY signal is sent from the CPU 334 to the CPU 224, thereby setting on the shutter release prohibiting state, the RMRL signal is not sent from the CPU 334 to the CPU 224 even when the shutter release start signal is input through the release button 346 or the personal computer 800. Accordingly, the photographing operation is not carried out.

Figure 11:
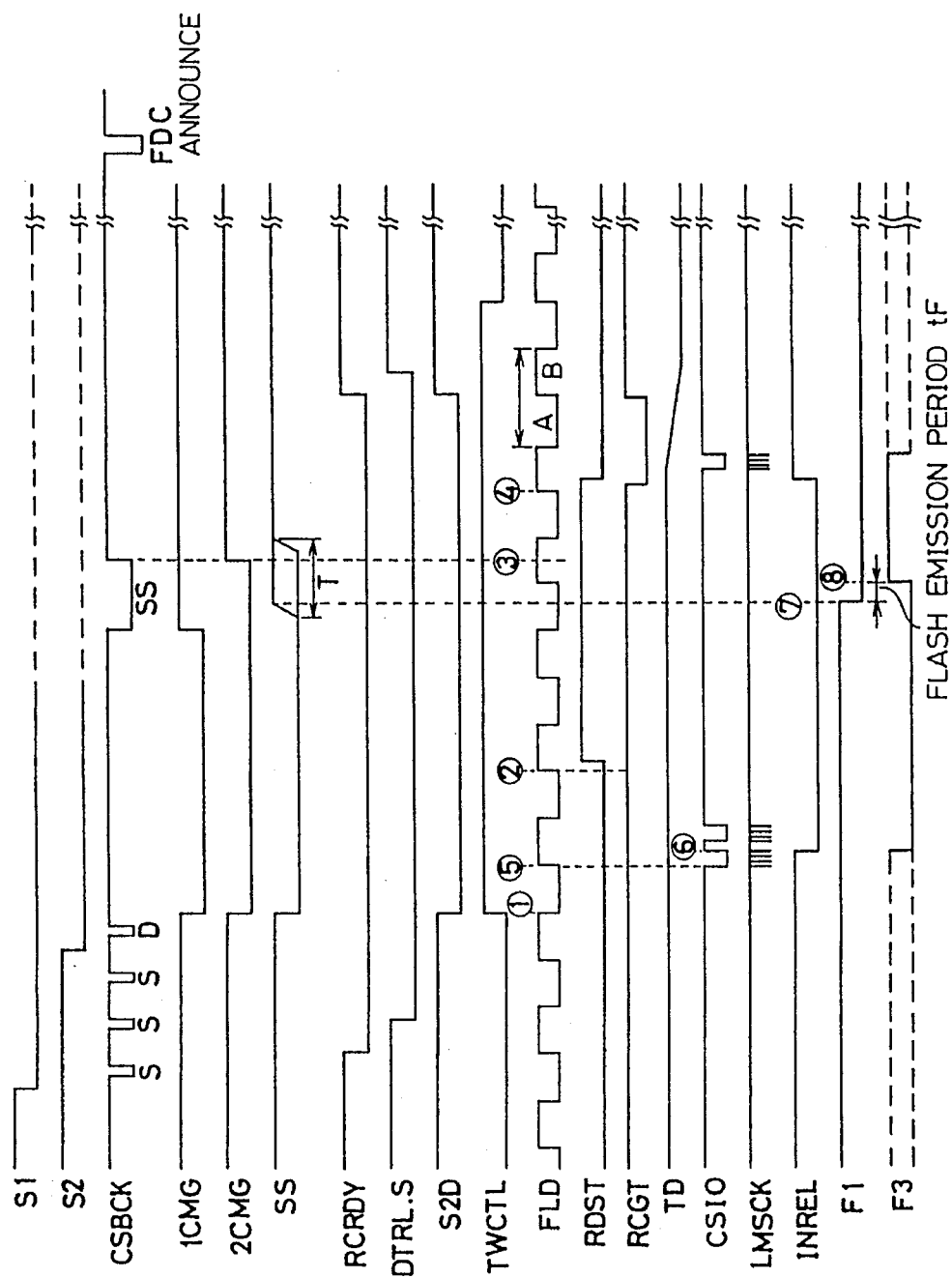
FIG. 11 is a timing chart showing the shutter release timing in a flash firing photographing operation of the still video camera.

FIG. 11 is a timing chart showing the shutter release timing in a photographing operation wherein the flash device 104 is fired. This figure shows a CSIO signal, an LMSCK signal, an INREL signal, an F1 signal and an F3 signal in addition to those shown in FIG. 9. Since the flash firing photographing operation is similar to the normal photographing operation, there will be only described contents of the CSIO signal to the F3 signal and the flash synchronization in accordance with these signals here. It will be appreciated that the flash synchronization is to synchronize the flash firing with the shutter release operation.

The CSIO signal is a signal representative of that the flash device 104 is fired in the photographing operation. The CPU 224 sends the CSIO signal to the CPU 107 in the flash firing photographing operation. The LMSCK signal is a signal used to set a light emission adjustment data based on which the light is emitted from the flash device so as to properly synchronize the flash firing with the shutter release operation. The light emission adjustment data is set when the CSIO signal is in the low level. The INREL signal is a light emission adjustment start signal sent to the flash device 104. The F1 signal is a command signal in accordance with which the flash device 104 is caused to start emitting the light. The F3 signal is a command signal in accordance with which the flash 104 is caused to stop emitting the light. An FDC announce communication in the CSBSK signal is indicative of completion of the flash synchronization, and is conducted after the level of the PWCTL signal falls to low upon completion of the photographing operation.

When the flash device 104 is mounted, the CPU 107 discriminates, by communicating with the CPU 113, whether the flash device 104 is mounted on the camera unit 100, what type of the flash device 104 is mounted, and whether the flash device 104 has been completely charged yet. Further, in the case where the S1 signal is input through the release button 101 when the flash device 104 is mounted and has been completely charged, the CPU 107 makes the above discriminations through the communication with the CPU 113. Then, the CPU 107 calculates an aperture value and a shutter speed suited to the flash synchronization based on the confirmed mounted flash information, and sets the calculation result as an exposure control value. Further, the CPU 107 causes the taking lens 105 to be adjusted so as to attain the in-focus condition.

The mounted flash information is transferred to the CPU 224 through the S-communication. The CPU 224 sets the sensitivity information according to the color temperature of the light emitted flash device 104 in the sensitivity setting circuit 225 based on the received mounted flash information, and transfers the set sensitivity information to the CPU 107. Further, upon confirming that the flash device 104 has been completely charged based on the mounted flash information, the CPU 224 sends the control signal to the WB controller 222 through the X-terminal thereof, thereby turning off the switch 2221. The CPU 224 also transfers the information on the color temperature of the light emitted from the flash device 104 (in the form of a signal representative of the flash device α or the flash device β) to the WB correcting circuit 220 through the WB controller 222. The WB correcting circuit 220 in turn sets a correction value corresponding to the color temperature of the light emitted from the flash 104 in the WB circuit 2202 as a WB correction value. This causes the WB correcting circuit 220 to perform the WB correction suitable in the flash firing photographing operation.

In this way, the WB correcting circuit 220 are disconnected from the circuits provided between the WB switch 226 and the circuit 220, and the CPU 224 automatically sets the specified WB correction value according to the color temperature of the light emitted from the mounted flash device 104 in the WB correcting circuit 220.

In FIG. 11, upon the input of the S2 signal through the operation of the release button 101, the CPU 107 starts the charging of the front and the rear blinds through the D-communication as described above. The CPU 224 sends the low level S2D signal to the CPU 334, thereby bringing the memory 332 into the write enabling state. The CPU 224 also sends the high level PWCTL signal to the switch SW1 so as to turn it on. Thereby, the DC/DC converter 223 supplies the power to the drive control circuit 217 to cause the CCD 215 to start the image pick-up operation.

The CSIO signal is inverted from the high level to the low level in synchronism with the first rise of the FLD signal (at a timing ⑤) after the rise of the PWCTL signal (at a timing ①), and the light emission adjustment data is set while the CSIO signal is kept in the low level (output of the LMSCK signal). Subsequently, the level of the INREL signal falls to low at a timing when the CSIO signal is inverted to the high level (at a timing ⑥), thereby bringing the flash device 104 into a light emission adjustment enabling state. In other words, the level of the F3 signal is inverted from the high level to the low level, thereby bringing the flash device 104 into a synchronization enabling state.

Thereafter, the exposure control is started, and the level of the F1 signal falls to low at timing when the front blind is fully open (at a timing ⑦). At this timing, the flash device 104 emits a flashlight. An amount of the flashlight reflected by the object and introduced to the relay lens system 216 is measured by the light measuring sensor 221. When the amount of the received flashlight reaches an appropriated amounted (at a timing ⑧), the level of the F3 signal falls to low, and thereby the light emission of the flash device 104 is stopped.

After completion of the SS-communication (at a timing ③), the CPU 224 stops sending the RDST signal to the drive control circuit 217 in synchronism with the first or the second rise of the FLD signal (at a timing ④) thereafter. The CPU 224 also releases the prohibiting state of reading the electric signal from the CCD 215, and stops sending the RCGT signal to the CPU 334 so as to start recording the photographed image. Thereupon, the electric signal representative of the electric charges stored in the CCD 215 is read out to the video signal processing circuit 219 in accordance with the field shift signal sent from the drive control circuit 217. The read electric signal has the specified signal processing applied thereto in the video signal processing circuit 219, and is output to the DAT recorder 300 to be stored in the memory 332.

As described above, in the WB circuit 2202 of the WB correcting circuit 220 is set the WB correction value according to the color temperature of the light emitted from the mounted flash device 104, and a suitable WB correction is performed according to the color temperature of the light emitted from the mounted flash device 104.

There will be described an operation of recording the object image photographed by the camera unit 100 on the DAT loaded in the DAT unit 340 next.

When an object image is photographed by the camera unit 100, a light image incident through the taking lens 105 has its magnification converted by an imaging lens system. The image is then formed on the CCD 215 of the image pick-up device 200, and is converted into an electric signal, namely an image signal. The image signal is converted in the signal processing unit 219 into a luminance signal Y and color difference signals (R-Y), (B-Y), which are output to the DAT recorder 300 through the cable 400.

The image signal input to the DAT recorder 300 is A/D converted by the A/D converter 331 into a digital image signal and is stored in the memory 332. At this time, the identical image signal is stored in the first and the second frame memories of the memory 332. More specifically, the image signal stored in the first frame memory is repeatedly read out in a cycle corresponding to that of a synchronizing signal adopted by a television system. The read image signal passes through the multi-signal processing unit 341 and the D/A converter 342, and is converted by the encoder 343 into a NTSC signal, i.e. an NTSC composite signal, or a Y/C signal (where C is a color difference signal) to be output to the monitor 500. Consequently, the photographed image is displayed as a visual image on the screen of the monitor 500.

On the other hand, the image signal stored in the second frame memory of the memory 332 is read in synchronism with the running of the DAT, and is input to the DAT unit 340. After being converted into a specified PCM signal in accordance with the format of the DAT by the signal processing unit 3404, this image signal is written in data record region of the DAT to be described later. At this time, the CPU 334 causes an address, an ID code, and other various data corresponding to the image signal to be written as a sub-code in a sub-record region or an INDEX region provided at the head of the tape. The CPU 334 sends the shutter release prohibition signal to the CPU 224 so as to prohibit the camera unit 100 from executing a next photographing operation while the image signal is being written on the DAT. Accordingly, the contents of the memory 332 are not renewed by a next photographed image until the operation of writing the last image signal in the DAT is completed.

The DAT recorder 300 has two record modes, namely an ID mode and a serial mode. In the ID mode, a record region for the image signals is set by the block on the DAT in advance, an ID code is added to the image signal to be recorded, and the image signal is recorded in the record region corresponding to the ID code thereof. The ID mode is advantageous in executing retrieving, reproducing, and other operations for the image signals rapidly and easily since the ID codes are added to the image signals.

On the other hand, in the serial mode, the image signals are recorded on the DAT sequentially from a leading end of the DAT. The serial mode is advantageous in starting the recording operation promptly even in the case an unused DAT is loaded since the image signals are recorded on the DAT from the leading end thereof without requiring the setting of the record region for the image signals in advance.

Figure 12:
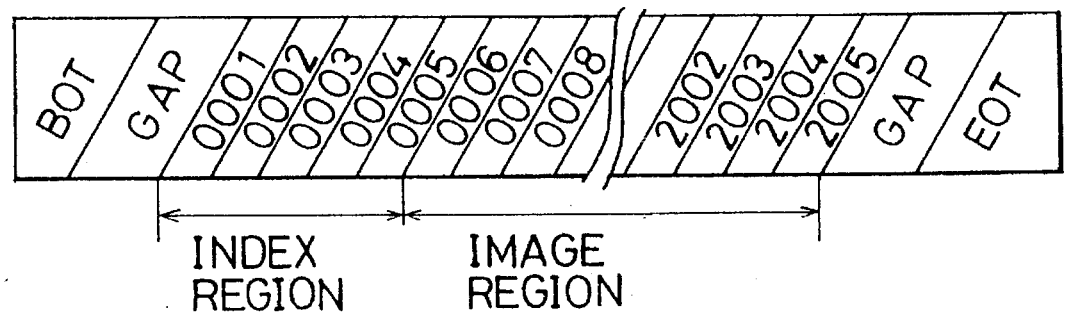
FIG. 12 is a diagram showing a record region of a tape in an ID mode.

FIG. 12 shows a record region in the serial mode and, particularly showing a record region in the case where image signals of 2000 frames of still images are recorded on a magnetic tape of the width of 60 mm.

In the serial mode, the INDEX region of the specified size is set after a front GAP region of the magnetic tape, and the image signals are recorded sequentially after the INDEX region. When the image signal for a 2000th frame of image is recorded, a EOT (end of tape) is recorded after setting rear GAP region. Since a region of first to fifth units is assigned as an INDEX region in an example shown in FIG. 12, the image signals are recorded in 6th to 2005th units.

Figure 13:
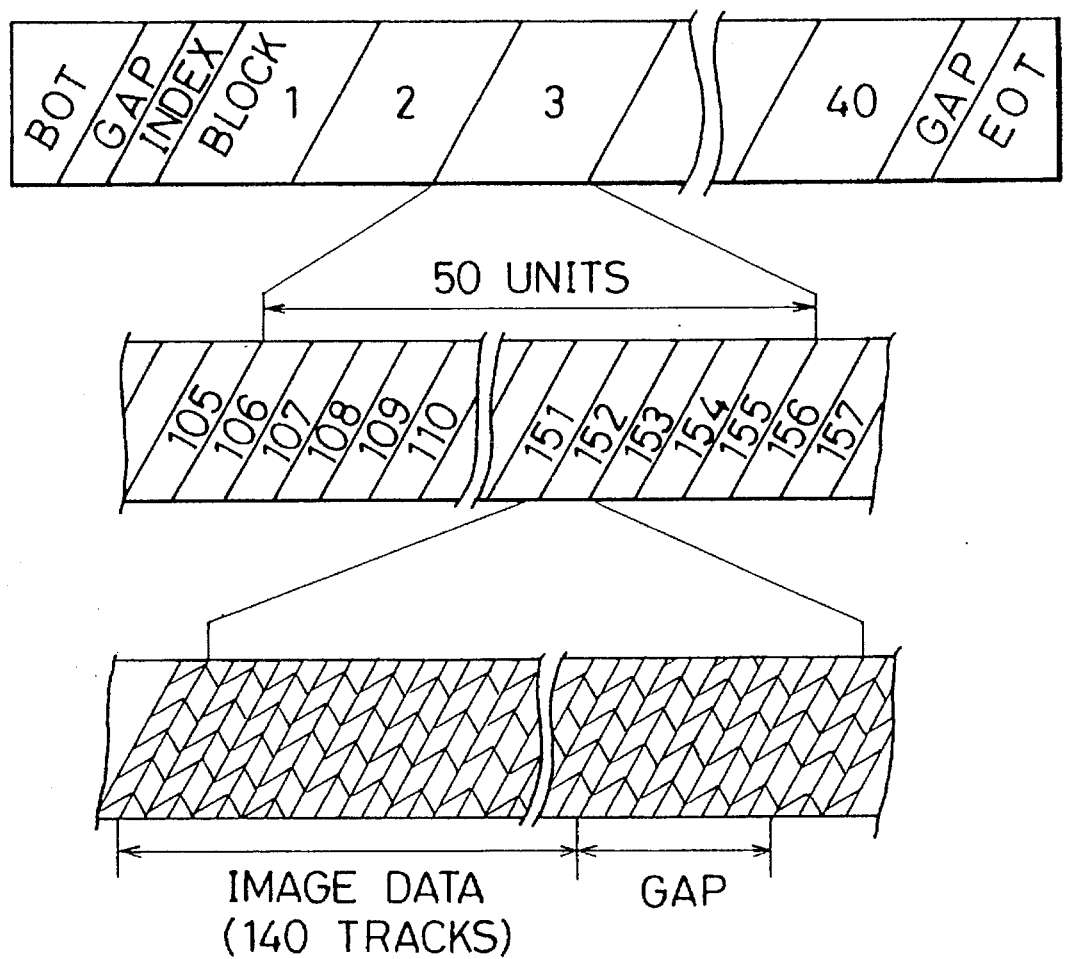
FIG. 13 is a diagram showing a record region of the tape in a serial mode.

FIG. 13 shows an example of a record region on the tape in the ID mode. Similarly to FIG. 12, this figure shows the record region in the case where image signals of 2000 frames of still images are recorded on a magnetic tape of the width of 60 mm.

In the ID mode, an INDEX region of the specified size is provided after a front GAP region (a region for stabilizing the running of the tape), and the image signals are recorded after the INDEX region. In the INDEX region, there are recorded information concerning the image signals including the ID codes, serial image numbers (addresses) in the ID codes, collation data between the serial image numbers and the numbers of units in which the image signals are recorded, and dates on which the photographing operations are conducted.

If it is assumed that one unit is a capacity to store the image signal of one frame of image, the record region for the image signals in this case consists of 2000 units. Each unit consists of, for example, a record area including 140 tracks and a blank area including several tens of tracks. The record region for the image signals is divided into 40 blocks, each block consisting of 50 units and corresponding to the ID code. Accordingly, the image signal is recorded in a region defined by the unit of a specified number in the block corresponding to the ID code added to the image signal.

In FIG. 13, a region defined by 1st to 55th units is assigned as an INDEX region. Thus, a first block consists of 56th to 105th units; a second block consists of 106th to 155th units; . . . a 40th block consists of 1956th to 2005 units. A rear GAP region and an EOT are provided after the 40th block.

In the above example, the record region for the image signals is divided into 40 blocks, each block consisting of 50 units, and the ID code is provided for each block. However, a desired number of ID codes may be set according to the length of the tape. For instance, it may be appropriate to fix the number of the image signals stored under one ID code, or to fix the number of ID codes regardless of the length of the tape. In the former case, since the number of the ID codes is in proportion to the length of the tape, the length of the loaded tape can be detected according to the number of the ID codes.

Next, there will be described an operation of reproducing the image signals recorded on the DAT.

The image signal read from the DAT is reconverted from the PCM signal into the original one by the signal processing unit 3404 in the DAT unit 340, and is sent to the first frame memory of the memory 332 to be stored therein. The image signal stored in the memory 332 is repeatedly read out in the cycle corresponding to that of the synchronizing signal adopted by the television system. The read signal is converted into the NTSC composite signal or the Y/C signal by the encoder 343 after passing through the multi-signal processing unit 341 and the D/A converter 342, and is output to the monitor 500 to be displayed on the screen thereof as a visual image.

The multipicture mode is controllable by operating the remote controller 700. Each time the MULTI key provided on the remote controller 700 is depressed, the display mode is cyclically changed in this order; normal display mode→four picture mode→nine picture mode→PinP mode. Also, the multipicture mode may be returned to the normal display mode by depressing a "1" key of the numeric keys in the multipicture mode. When the four picture mode is selected by manipulating the MULTI key, the screen of the monitor 500 is divided into four sub-screens. The reproduced visual image is moved and displayed in an upper left sub-screen, and no images are displayed on the other three sub-screens. When the operator desires to reproduce the visual images on the other three sub-screens, he/she manipulates the FWD key or the BWD key to select desired frames, and depresses the MEMORY key to reproduce the selected frames of images on upper right, lower left, and lower right sub-screens in this order. The visual images are reproduced in a similar manner in the nine picture mode. When the PinP mode is selected, a sub-screen appears at a lower right corner of the screen. In this mode, the same visual image is reproduced in a main screen and the sub-screen. Manipulating the FWD key or BWD key, the visual image reproduced in the main screen is changed. The visual image reproduced in the main screen is transferred to the sub-screen by depressing the MEMORY key, and thereby displaying the same visual image in the main screen and the sub-screen.

Various operations of the photographed image recording and reproducing system according to the invention will be described next with reference to flow charts shown in FIGS. 14A to 19 in the case where such a system is applied to a dental business.

Figure 14A:
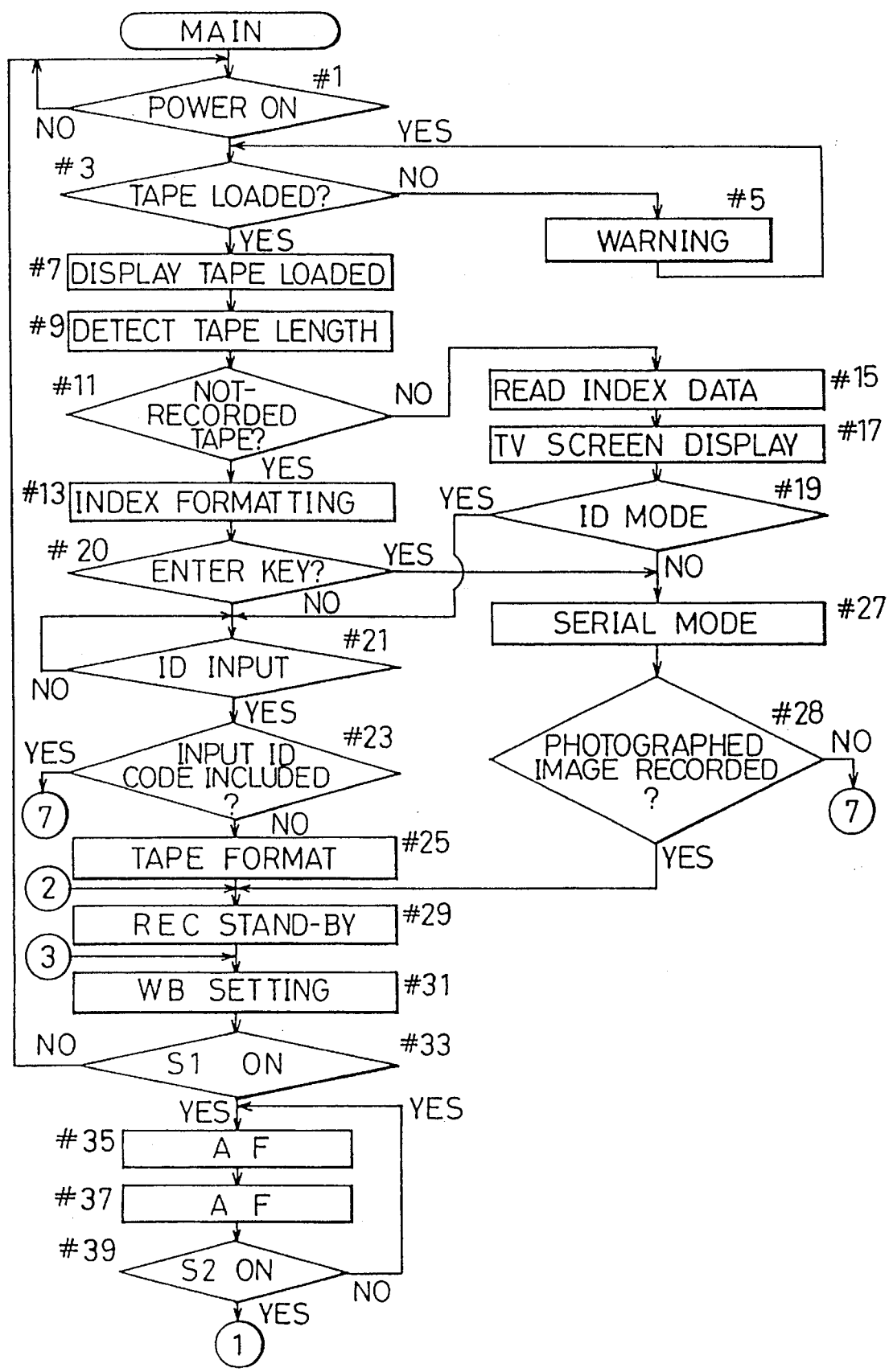
FIGS. 14A, 14B, and 14C are a flow chart showing operations of recording and reproducing the photographed images.
Figure 14B:
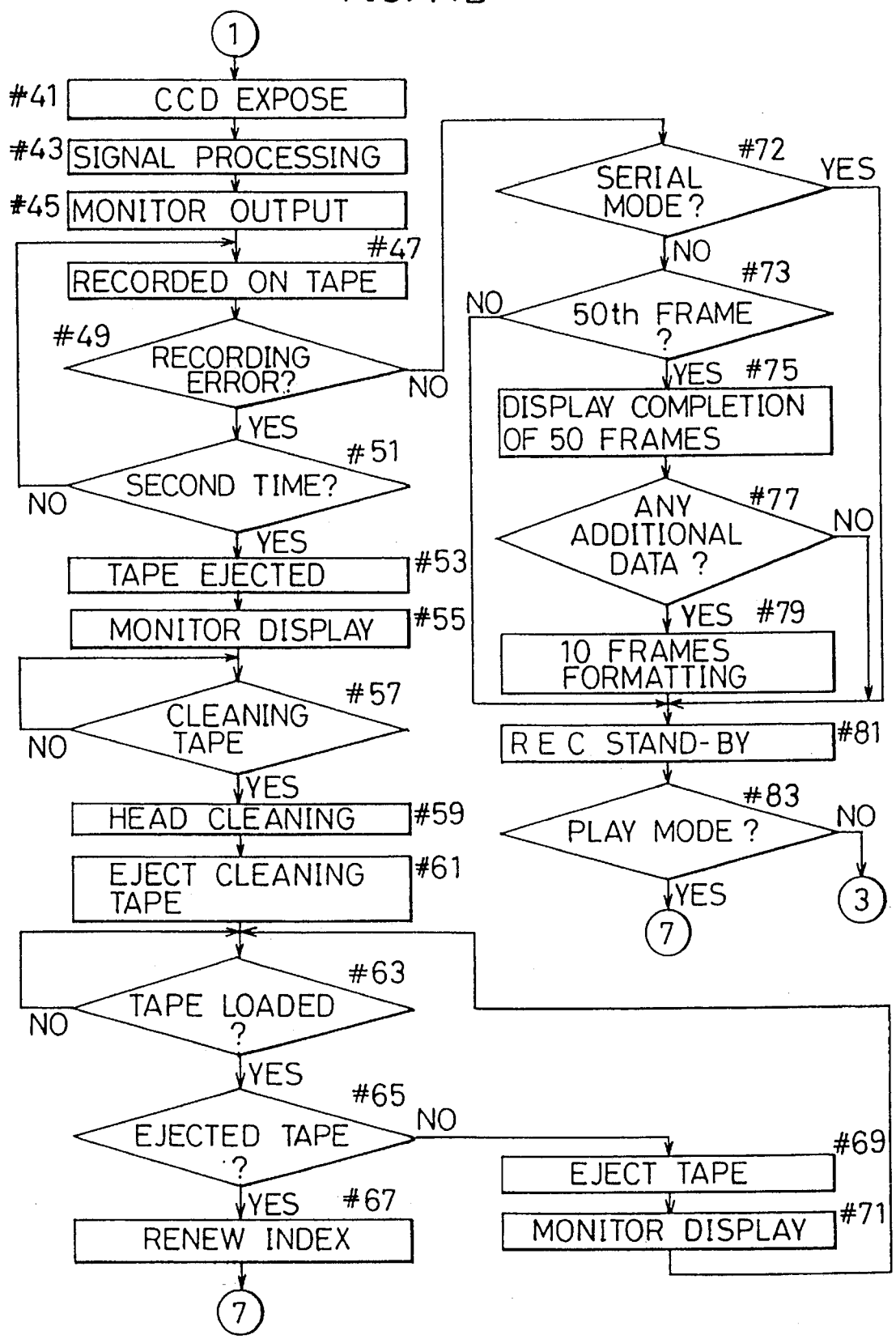
Figure 14C:
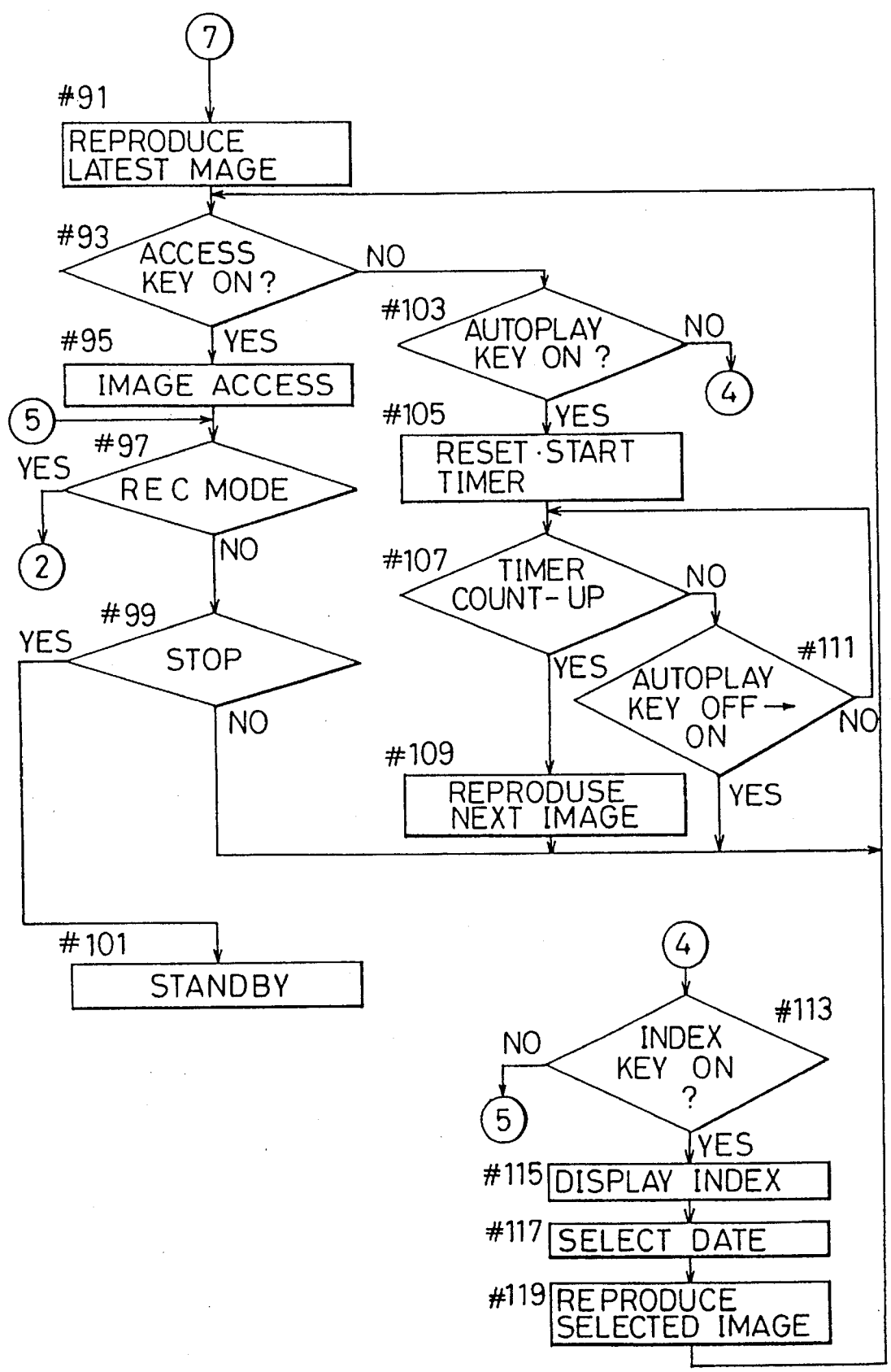

FIGS. 14A, 14B and 14C are flow charts showing a "Main Routine" of recording the photographed image on the DAT and reproducing the recorded image.

At the onset, the POWER key is turned on to activate the CPUs 224, 334, and it is discriminated whether the camera unit 100, the monitor 500, and the flash device 104 have been activated in Step #1. Upon confirmation of turn-on of the power supply, it is discriminated whether the tape, i.e. the DAT, is loaded in the DAT recorder 300 in Step #3. If the tape is not loaded yet (NO in Step #3), a warning is given to an operator by displaying "NO TAPE" on the screen of the monitor 500 or by using audible sounds in Step #5.

When the tape is loaded (YES in Step #3), "TAPE LOADED" is displayed on the screen of the monitor 500 in Step #7, and the length of the loaded tape is detected in Step #9. The detection of the length of the tape is made by, for example, reading a code which is indicative of the length of the tape and is provided on the tape cassette, or by detecting an amount of tape mounted on a supply reel of the cassette in a state where the tape is completely rewound or a tape position. Subsequently, it is discriminated whether the loaded tape is an unused one, i.e. a new tape, in Step #11. If the loaded tape is new (YES in Step #11), the tape is formatted so as to set the INDEX region (index formatting) in Step #13. It is then discriminated whether the ENTER key has been operated in Step #20. The ENTER key is operated after the index formatting when the serial mode is selected as a record mode. Accordingly, since the ID mode is set as a record mode unless the ENTER key has been operated, it is waited until the ID code is input in Step #21. On the other hand, if the ENTER key has been operated (YES in Step #20), the serial mode is set in Step #27.

If the loaded tape is not new (NO in Step #11), the index data is read from the INDEX region of the loaded tape in Step #15, and the contents of the index are displayed on the screen of the monitor 500 as shown in FIG. 15 in Step #17. Subsequently, it is discriminated whether the ID mode is set as a record mode in Step #19. The record mode is discriminated based on the read index data. If the ID mode is set as a record mode (YES in Step #19), "INPUT ID" is displayed on the screen of the monitor 500 so as to instruct an operator to input the ID code. At this stage, an ID code of an outpatient is input using the remote controller 700 or the card reader/writer 600. It is discriminated whether the ID code has been input through the remote controller 700 or the card reader/writer 600 in Step #21. Upon the input of the ID code (YES in Step #21), it is discriminated whether the input ID code is already included in the index data by collating the input ID code with the ID codes included in the read index data in Step #23. If the input ID code is included in the index data (YES in Step #23), this routine proceeds to Step #91 to carry out a playback mode to be described later.

On the other hand, if the patient is a first-time patient and therefore his/her ID code does not exist in the index data yet (NO in Step #23), the tape is formatted so as to attain a record region for recording, e.g. 50 frames of photographed images of the first-time patient in Step #25. Upon completion of the formatting, the tape is caused to run so that the magnetic head is set at a leading end of the newly set record region, and this routine waits on stand-by for the recording operation in Step #29.

If the serial mode is set as a record mode (NO in Step #19 or YES in Step #20), it is discriminated whether the photographed image is recorded in Step #28. Unless the photographed image is recorded (NO in Step #28), this routine proceeds to Step #91. On the other hand, if the photographed image is recorded (YES in Step #28), this routine proceeds to Step #29 to wait on stand-by for the recording operation. "WAIT" is displayed on the screen of the monitor 500 until the operations of Steps #19 to #28 are completed. In Step #29, "REC STAND-BY," which indicates a preparatory recording operation is completed, is displayed on the screen of the monitor 500. When the serial mode is set, it may be more preferable for the DAT recorder 300 to enter the record mode immediately if the tape is discriminated to be new, and to enter the playback mode if the tape is discriminated to be used already.

There follows an operation of photographing an affected part of the first-time patient. At first, a WB factor for the camera unit 100 is set in Step #31. The WB factor is set by suitably switching the state of the WB switch 226 depending upon whether the photographing operation is conducted under the sun, an incandescent lamp, or a cool white fluorescent lamp. In the case where the flash device is fired, a WB factor suitable in the flash firing photographing operation is set regardless of the state of the WB switch 226. Upon completion of the setting of the WB factor, the affected part of the patient, e.g. teeth, are photographed.

When the release button 101 is depressed halfway (YES in Step #33), the camera unit 100 is activated to execute the preparatory photographing operation. Specifically, the focusing condition is detected in Step #35, the brightness of the object is detected in Step #37, and the in-focus condition indicator provided in the viewfinder 227 of the camera unit 100 is lighted which functions as a photographing stand-by indicator. These operations are repeatedly executed until the release button 101 is depressed all the way from the state where the button 101 is depressed halfway (NO in Step #39). Here, if the release button 101 returns all the way up to the original state, this routine returns to Step #1 and is started from the beginning. When the release button 101 is depressed all the way (YES in Step #39), the shutter device 112 is opened and closed, and the CCD 215 of the image pick-up device 200 is exposed during an exposure period, thereby the light image incident through the taking lens 105 is picked up in Step #41. In the case where the brightness of the object is insufficient, the flash firing photographing operation is conducted if the charging completion indicator 230 is lighted.

In Step #43, the image signal is read from the CCD 215, introduced to the video signal processing circuit 219 to be converted into the luminance signal and the color difference signals, A/D converted, and stored in the memory 332. The stored image signal is repeatedly read out and output to the monitor 500 to be displayed on the screen thereof in Step #45. The image signal is also recorded on the tape in Step #47.

Subsequently, the image signal recorded on the tape is reproduced, and it is discriminated on the basis of the reproduced signal whether there has occurred any error in recording the image signal in Step #49. If the reproduced signal carries an uncorrectable error (YES in Step #49), the same image signal is recorded on the tape again and it is discriminated whether there has occurred any error in recording the image signal (a loop of Steps #51, #47, and #49). If the recording error has occurred in the second recording operation for the image signal (YES in Step #51), the loaded tape is ejected to clean the magnetic head, "HEAD CLEANING" is displayed on the screen of the monitor 500, and it is waited until a cleaning tape is loaded in Steps #53 to #57.

When being loaded (YES in Step #57), the cleaning tape is caused to run a specified distance so as to clean the magnetic head of the deck unit 3401 in Step #59. Upon completion of the cleaning of the magnetic head, the cleaning tape is ejected in Step #61, and it is waited until the previously loaded tape for the recording is loaded in Step #63. When the tape is loaded (YES in Step #63), the index data is read out, and it is discriminated whether the loaded tape is same as the one ejected for the head cleaning based on the read index data in Step #65.

If the loaded tape is the one ejected for the head cleaning (YES in Step #65), the index data is renewed in Step #67. Thereafter, this routine proceeds to Step #91 in which the DAT recorder 300 enters the playback mode. If the loaded tape is different from the one ejected fro the head cleaning (NO in Step #65), the tape is ejected in Step #69, and a message is displayed on the screen of the monitor 500 so as to instruct the operator to load the correct tape in Step #71. Then, this routine returns to Step #63, and waits until the correct tape is loaded (a loop of #63 to #71).

On the other hand, if the reproduced signal carries no error or only a correctable error (NO in Step #49), it is discriminated whether the serial mode is set as a record mode in Step #72. If the ID mode is set (NO in Step #72), it is discriminated whether the recorded image signal is representative of a 50th frame of image in Step #73. If the recorded image signal is representative of the 50th frame of image (YES in Step #73), messages are displayed on the screen of the monitor 500 so as to inform the operator that the tape for the patient has run out and also to inquire the operator whether there is any additional data to be recorded in Step #75. The CPU 334 discriminates whether there is any addition data to be recorded in accordance with an instruction input through the remote controller 700 or the card reader/writer 600 in Step #77. If the additional data is recorded (YES in Step #77), the tape is formatted to attain an addition record region for recording 10 frames of images in Step #79. When the tape is caused to run so that the magnetic head is set at a leading end of the additional record region, the "REC STAND-BY" is displayed in a superimposing manner on the screen of the monitor 500 for the additional data, thereby permitting a next photographing operation to be conducted in Step #81.

If the serial mode is set (YES in Step #72), or if the recorded image is not representative of the 50th frame of image (NO in Step #73), this routine proceeds directly to Step #81 without executing the operations of Steps #75 to #79. Further, if no additional data is recorded (NO in Step #77), this routine proceeds to Step #81 without executing the operation of Step #79.

Subsequently, it is discriminated whether the playback mode, i.e. the reproduction mode, is set in Step #83. If the playback mode is not set (NO in Step #83), this routine returns to Step #31 and the photographing operation similar to the one described above is repeated. If the playback mode is set (YES in Step #83), the DAT recorder 300 enters the playback mode.

The playback mode is set by depressing the REC/PLAY key 3308 provided on the DAT recorder 300, and "PLAY" is displayed on the screen of the monitor 500 at that time.

When the record mode is changed to the playback mode, the images of the patient presently photographed are reproduced. More specifically, the DAT recorder 300 accesses the record region corresponding to the ID code of the patient, sets the magnetic head at a leading end of a record area where the latest photographed image is recorded and which is located at the last of the record region (record file) of the patient, and reproduces the latest visual image in Step #91. The reproduced images are accessed in the forward direction or the backward direction frame by frame (Step #95) each time the FWD key 3309 or the BWD key 3310, both keys serving as access keys, is depressed (YES in Step #93), thereby enabling reproduction of the images recorded in the record file of the patient. When the access key 3308 or 3309 is kept depressed for longer than 2 seconds, the recorded images are accessed frame by frame every 0.5 seconds, for example.

If the playback mode is still on and the STOP key 3312 has not been depressed (NO in Steps #97 and #99), this routine returns to Step #93. On the other hand, if the REC/PLAY key 3308 has been depressed (YES in Step #97), this routine returns to Step #29 so as to proceed to the record mode. If the STOP key 3312 has been depressed (YES in Step #99), it means that all the operations concerning the presently input ID code have been completed, and it is waited until a next ID code is input in Step #101. For instance, the recording and reproducing system may carry out an operation of photographing a next patient.

If neither of the access key 3308 nor 3309 has been depressed (NO in Step #93), it is discriminated whether the AUTOPLAY key 3311 has been depressed in Step #103. If the AUTOPLAY key 3311 has been depressed (YES in Step #103), a timer for measuring 5 seconds is reset and started in Step #105. In Step #107, it is discriminated whether the timer has measured 5 seconds yet. Upon lapse of 5 seconds (YES in Step #107), a next visual image is reproduced in Step #109. Unless the timer has measured 5 seconds (NO in Step #107), it is discriminated whether the AUTOPLAY key 3311 has been depressed in Step #111. If the AUTOPLAY key 3311 has been depressed (YES in Step #111), this routine returns to Step #93. In other words, the visual images are reproduced each frame from the presently reproduced one every 5 seconds in the same record file when the AUTOPLAY key 3311 is depressed once. The period during which each visual image is reproduced is not limited to 5 seconds, but may be set to about 10 seconds. Further, this period may be set desirably with the use of a time setting switch provided on an operation panel. While the visual images are reproduced, "AUTO PLAY" is displayed on the screen of the monitor 500 in the superimposing manner.

On the other hand, if neither the access keys 3308, 3309 nor the AUTOPLAY key 3311 has been depressed (NO in Steps #93 and #103), it is discriminated whether the INDEX key 3313 has been depressed in Step #113. If the INDEX key 3313 has not been depressed (NO in Step #113), this routine returns to Step #97. If the INDEX key 3313 has been depressed (YES in Step #113), the index data is displayed on the screen of the monitor 500 in Step #115. The retrieval information used to retrieve the image desired to be reproduced, e.g. the date, is selected from the index data on display using the UP key 314 or the DOWN key 3315 in Step #117. Thereafter, the DAT recorder 300 directly accesses the record region corresponding to an ID code of the selected image signal and an address included in the ID code, reads out the image signal, and reproduces the read image signal as a visual image in Step #119.

Figure 16:
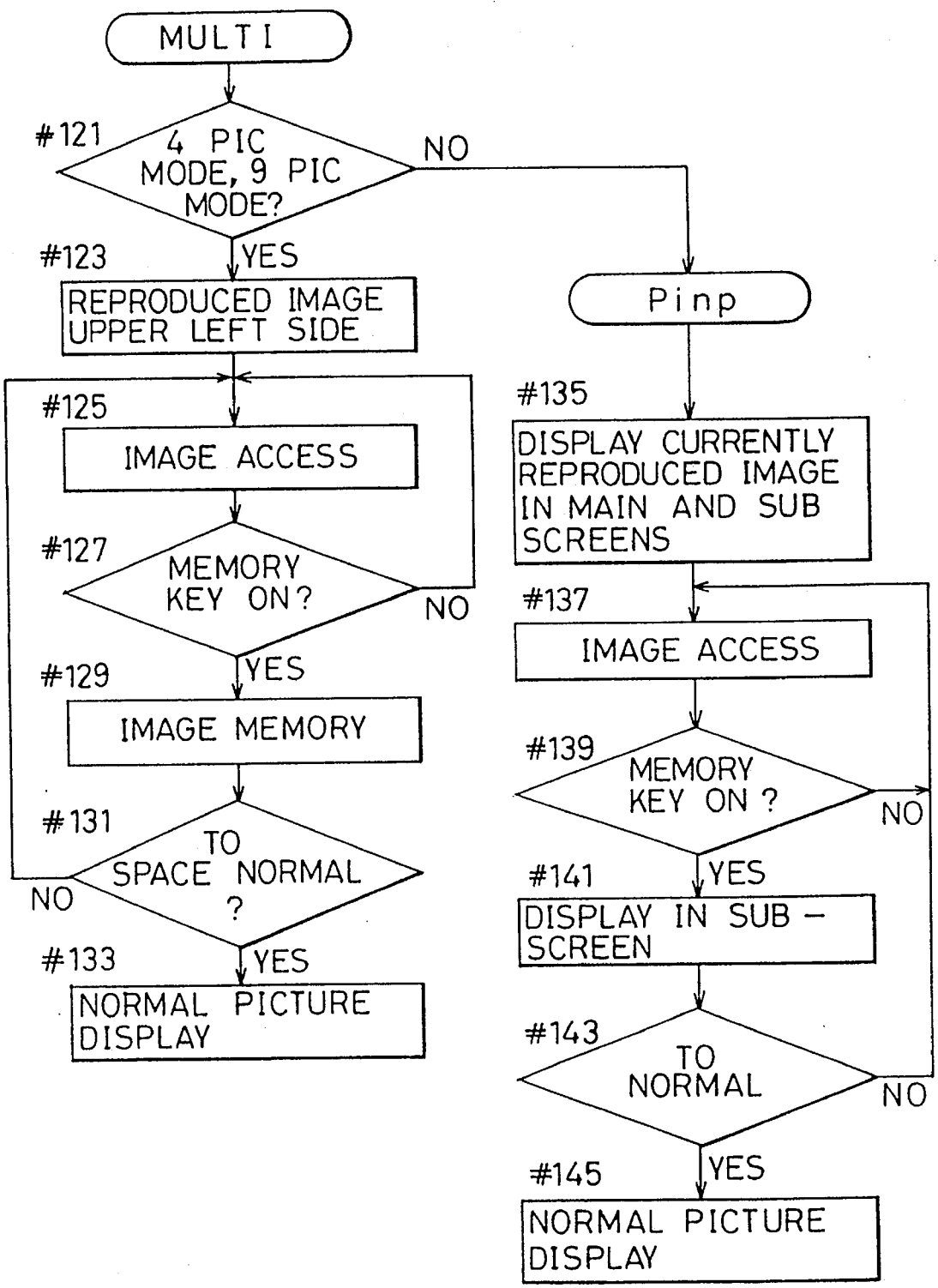
FIG. 16 is a flow chart showing an operation in a multipicture mode.

There will be described operations in the multipicture mode next with reference to FIG. 16.

First of all, it is discriminated whether either the four picture mode or the nine picture mode is selected in Step #121. If either the four picture mode or the nine picture mode is set (YES in Step #121), the reproduced visual image is transferred to the upper left sub-screen in Step #123. When the reproduced visual images are changed by operating the access key 3308 or 3309 in Step #125, it is discriminated whether the changed visual image is transferred to one of the sub-screens, i.e. the MEMORY key has been operated, in Step #127. If the MEMORY key has been operated (YES in Step #127), the visual image is transferred to the specified sub-screen in Step #129. Then, it is discriminated whether the MULTI key has been operated to change the display mode to the normal display mode in Step #131. If the MULTI key has been operated (YES in Step #131), the display mode is returned to the normal display mode in Step #133. On the other hand, if the MULTI key has not been operated (NO in Step #131), this routine returns to Step #125 in which the visual images are changed frame by frame by operating the access key 3308 or 3309.

If neither the four picture mode nor the nine picture mode is selected (NO in Step #121), the PinP mode is discriminated to be selected, and thereby the DAT recorder 300 sets the PinP mode. In the PinP mode, the presently reproduced visual image is displayed both on the main screen and the sub-screen in Step #135. When the visual image reproduced on the main screen is changed by operating the access key 3308 or 3309 in Step #137, it is discriminated whether the visual image presently displayed on the main screen is transferred to the sub-screen, i.e. the MEMORY key has been operated, in Step #139. If the MEMORY key has been operated (YES in Step #139), the visual image presently displayed on the main screen is transferred to the sub-screen in Step #141. Subsequently, it is discriminated whether the MULTI key has been operated to change the display mode to the normal display mode in Step #143. If the MULTI key has been operated, the display mode is returned to the normal display mode in Step #145. On the other hand, if the MULTI key has not been operated (NO in Step #143), this routine returns to Step #137 in which the visual image displayed on the main screen is changed by operating the access key 3308 or 3309.

Figure 17:
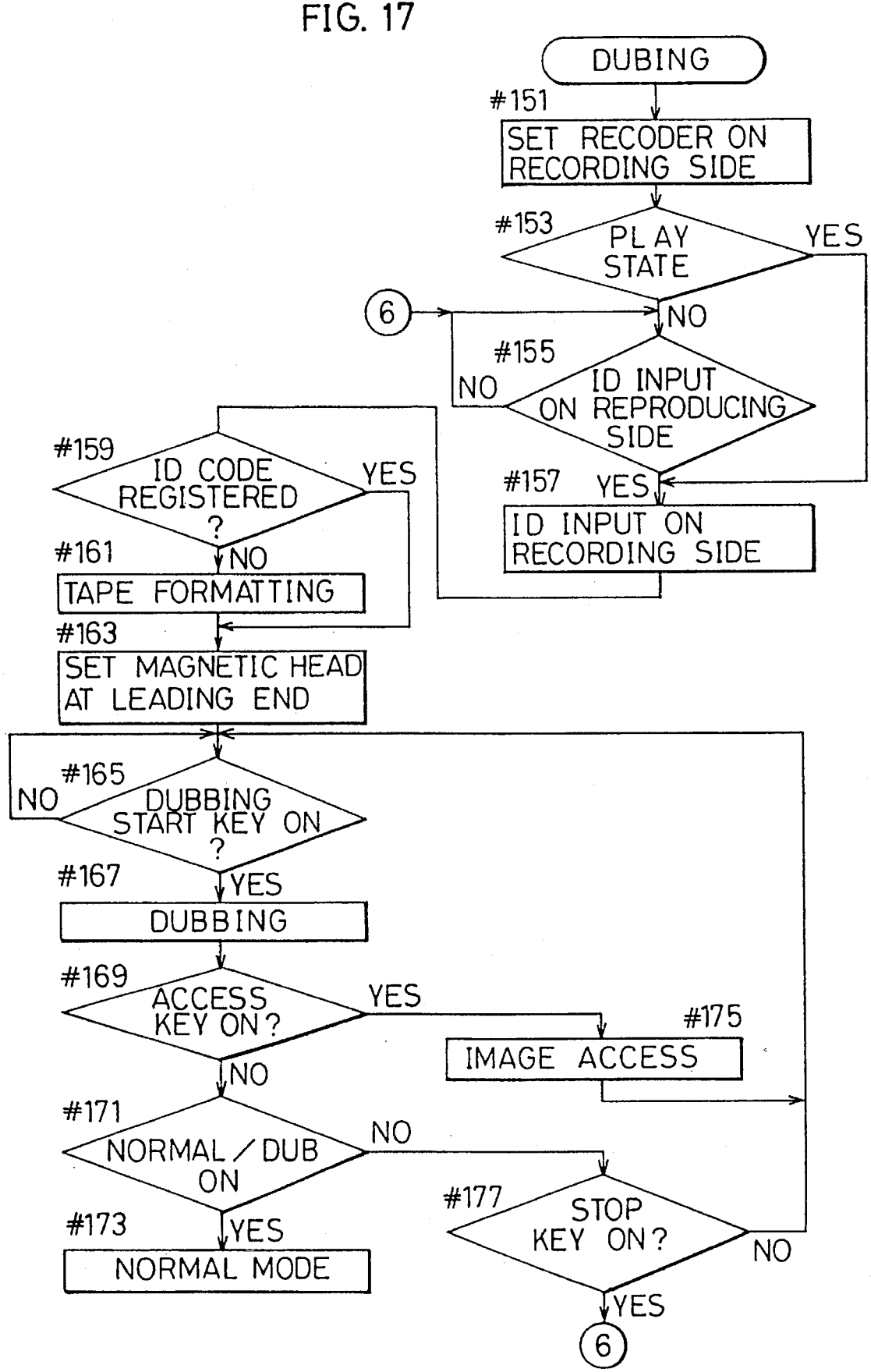
FIG. 17 is a flow chart showing an operation of dubbing image recorded on the tape to the other tape.

There will be described an operation of dubbing the images recorded on the tape to the other tape next with reference to FIG. 17.

First of all, a DAT recorder at a recording end (hereinafter referred to as a recording DAT recorder) is prepared, and has a dubbing terminal 3351 thereof connected to that of the DAT recorder at a reproducing end (hereinafter referred to as a reproducing DAT recorder). When the NORMAL/DUB key 3303 of the reproducing DAT recorder is depressed in this state, the dubbing mode is set in Step #151. Subsequently, it is discriminated whether the playback mode is on in the reproducing DAT recorder 300 in Step #153. If the playback mode is on (YES in Step #153), this routine proceeds to Step #157. If the playback mode is off (NO in Step #153), it is waited until an ID code corresponding to the record file desired to be dubbed is newly input (YES in Step #155).

In Step #157, the ID code is input as a name of the record file in the recording DAT recorder in Step #157. In the case where no ID code is set in the recording DAT recorder, the ID code corresponding with the one input in the reproducing DAT recorder is automatically given. Then, it is discriminated whether the ID code input this time has been already registered in the recording DAT recorder in Step #159. If the ID code has been already registered (YES in Step #159), the magnetic head is set at the leading end of the record region of the designated record file in Step #163. On the other hand, if the ID code has not been registered yet, i.e. new, (NO in Step #159), the tape is formatted similarly to Step #25 (Step #161), and the magnetic head is set at a leading end of the newly formatted record region (Step #163).

Subsequently, it is discriminated whether a dubbing start key has been depressed in Step #165. Upon depression of the dubbing start key (YES in Step #165), there is started a transfer of the recorded image from the reproducing DAT recorder to the recording DAT recorder so as to execute the dubbing operation in Step #167. Upon completion of the dubbing of one frame of image, it is discriminated whether a next frame of image is also dubbed, i.e. the access key 3308 or 3309 has been depressed, in Step #169. If the either key is depressed (YES in Step #169), another frame of image is dubbed after the fed frame of image is reproduced once, i.e. is confirmed (a loop of Steps #175 to #167). If neither of the access key 3308 nor 3309 has been depressed (NO in Step #169), it is discriminated whether the NORMAL/DUB key 3303 has been depressed in Step #171. If the NORMAL/DUB key 3303 has been depressed (YES in Step #171), the mode is changed from the dubbing mode to the playback mode in Step #173. If the NORMAL/DUB key 3303 has not been depressed (NO in Step #171), it is discriminated whether the STOP key has been depressed in Step #177. If the STOP key has been depressed (YES in Step #177), this routine returns to Step #155 and waits for a next ID code to be inputted so as to permit the other record file to be dubbed.

Figure 18:
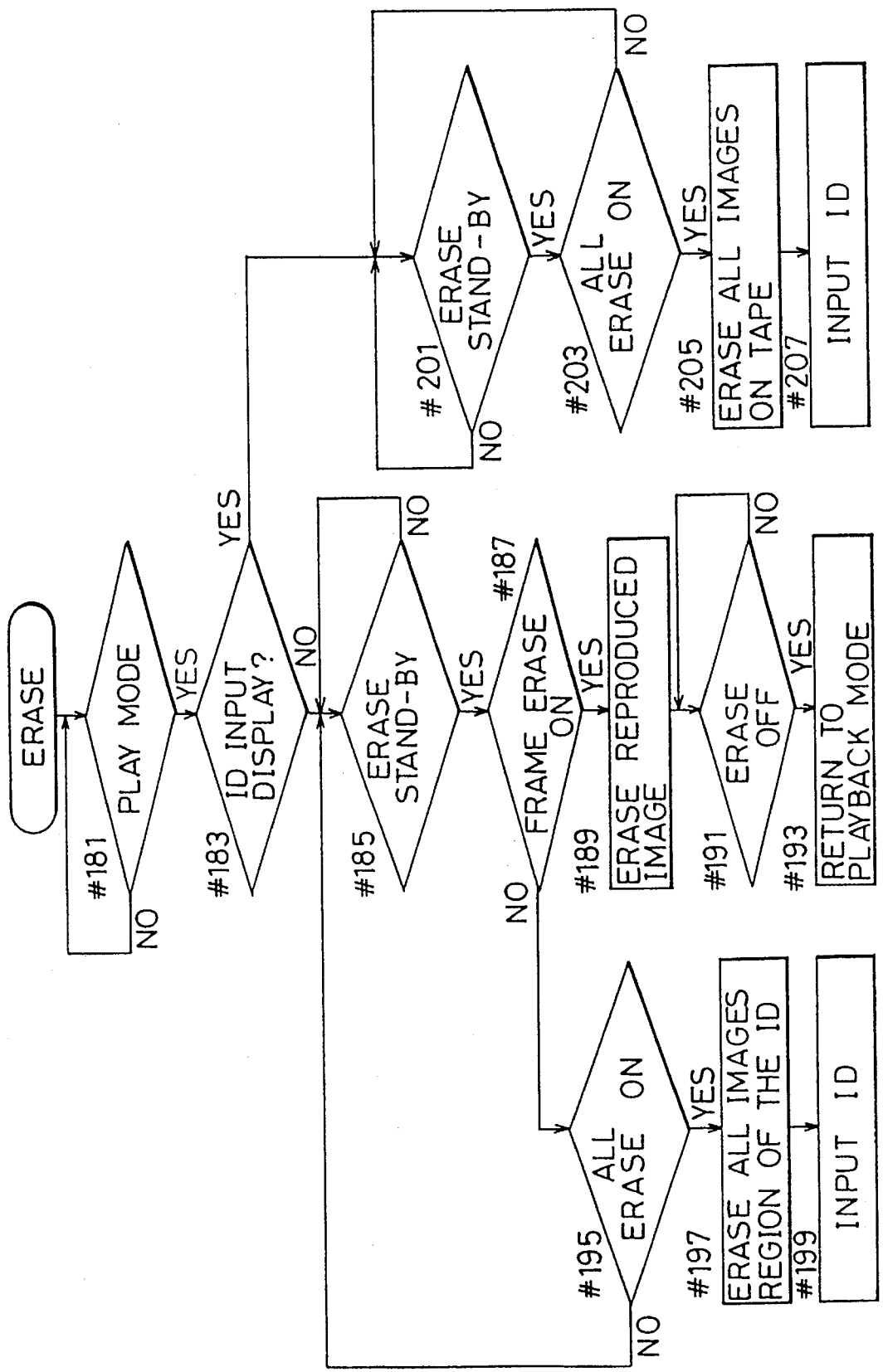
FIG. 18 is a flow chart showing an operation of erasing recorded image.

There will be described an operation of erasing the recorded image next with reference to a flow chart shown in FIG. 18. This erasure operation is controlled according to the operation of the remote controller 700.

When the erasure operation is to be executed in the DAT recorder 300, it is waited until the playback mode is set in Step #181. When the playback mode is set (YES in Step #181), it is discriminated whether "INPUT ID" is on display in Step #183. If "INPUT ID" is not on display (NO in Step #183), this routine proceeds to Steps #185 to #199 in which the image displayed on the screen of the monitor 500 is erased.

More specifically, it is waited until the ERASE STANDBY key provided on the remote controller 700 is depressed (YES in Step #185). Upon depression of the ERASE STANDBY key, it is discriminated whether the FRAME ERASE key has been depressed in Step #187. If the FRAME ERASE key has been depressed (YES in Step #187), the reproduced image is erased for one frame in Step #189. Upon completion of the erasure operation, it is waited until the ERASE STANDBY OFF key is depressed (YES in Step #191). Upon depression of the ERASE STAND-BY OFF key, the mode is changed to the playback mode.

If the FRAME ERASE key has not been depressed (NO in Step #187), it is discriminated whether the ALL CLEAR key has been depressed in Step #195. If the ALL CLEAR key has not been depressed (NO in Step #195), this routine returns to Step #185. On the contrary, if the ALL CLEAR key has been depressed (YES in Step #195), there are erased all the images recorded in the record region corresponding to the ID code of the image presently on display in Step #197. Upon completion of this erasure operation. "INPUT ID" is displayed in Step #199.

If "INPUT ID" is on display (YES in Step #183), this routine proceeds to Steps #201 to #207 in which all the images recorded on the tape are erased.

More specifically, it is waited until the ERASE STANDBY key provided on the remote controller 700 is depressed (YES in Step #201). Upon depression of the ERASE STANDBY key, it is discriminated whether the ALL ERASE key has been depressed in Step #203. If the ALL ERASE key has not been depressed (NO in Step #203), this routine returns to Step #201 and waits until the ALL ERASE key is depressed. If the ALL ERASE key is depressed. "INPUT ID" is displayed in Step #207 after all the image recorded on the tape are erased in Step #205.

In the case where the images are recorded in the serial mode, "INPUT ID" is not displayed since the images do not have corresponding ID codes. Accordingly, the recorded images are erased in Steps #185 to #199. In this case, if the ALL ERASE key is depressed in Step #195, all the images recorded on the tape are erased in Step #197 since it is considered that all the images are recorded under the same ID code in the serial mode.

When the ejection of the tape is executed upon completion of the necessary operations, the index data is renewably written in a specified region on the tape, and the tape is ejected through the insertion opening 3317.

Incidentally, in the record or the playback mode, it is desirable to keep the tape in contact with the magnetic head even when no operation is designated through the key provided on the DAT recorder 300 or the remote controller 700 so as to record or reproduce the image signal rapidly according to a specified key operation. However, this may shorten a life of the magnetic head or damage the tape.

Figure 19:
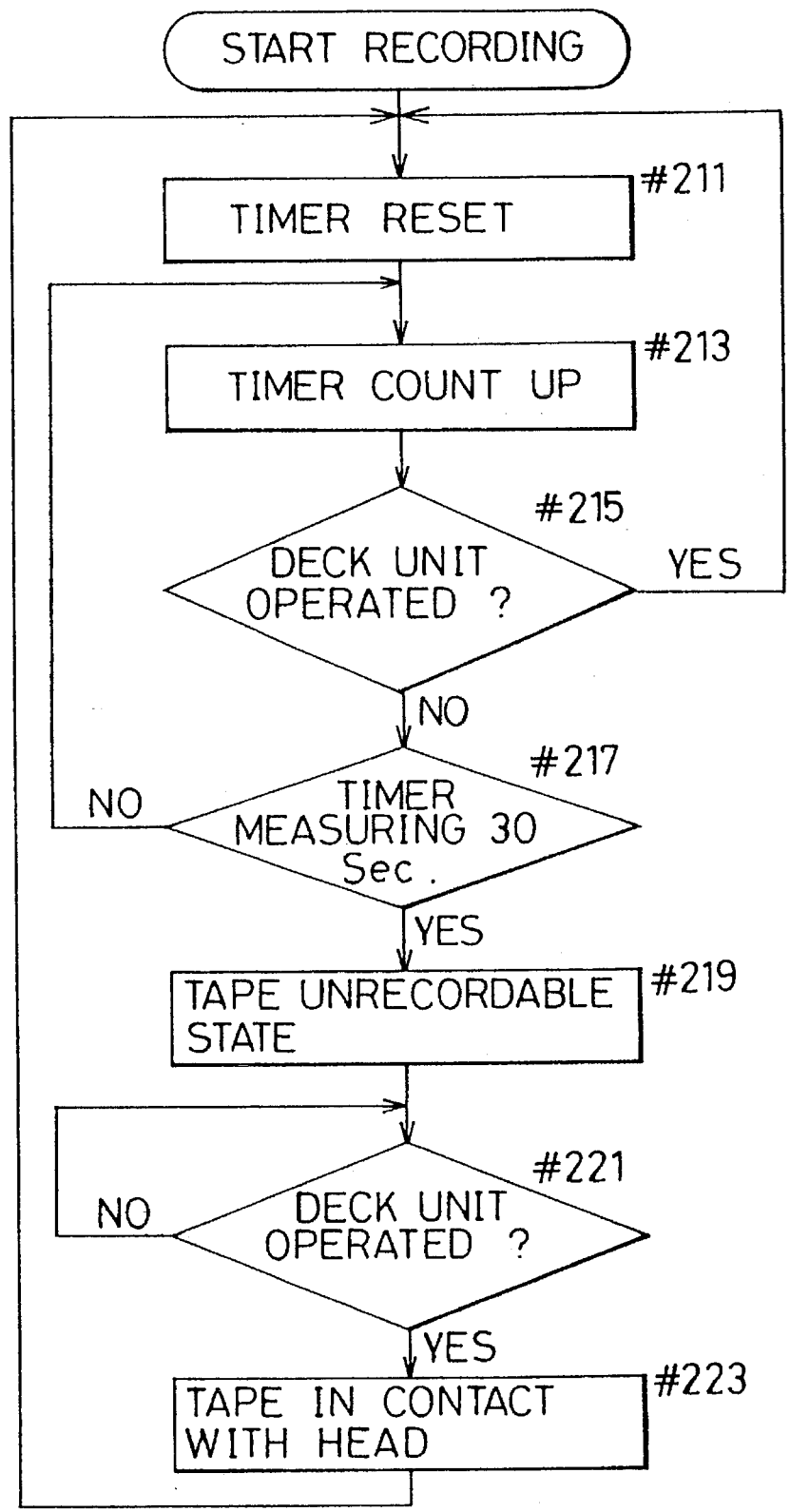
FIG. 19 is a flow chart showing a control of setting the tape relative to a magnetic head in a record mode.

FIG. 19 is a flow chart showing an operation of keeping the tape away from the magnetic head when the DAT recorder is in a stand-by state in order to reduce the damage to the magnetic head and the tape.

The operation shown in FIG. 19 will be described using the record mode as an example. When the record mode is started, a timer is first reset to start measuring a predetermined time, for example, 30 seconds in Steps #213 and 215. Then, it is discriminated whether any key concerning the deck unit 3401 has been operated in Step #215 while the timer is measuring 30 seconds (a loop of Steps #213 to 217). If some key has been operated (YES in Step #215), this routine returns to Step #211 to start measuring 30 seconds again.

When the timer measures 30 seconds while no key concerning the deck unit 3401 is operated (YES in Step #217), the tape is brought to an unrecordable state in Step #219 and it is waited until any key concerning the deck unit 3401 is operated in Step #221. In the unrecordable state, the tape may be completely accommodated in the cassette, thereby being kept away from the magnetic head, or the force to press the tape against the magnetic head may be reduced. Upon operation of the key concerning the deck unit 3401, the tape is brought into pressing contact with the magnetic head again in Step #223. Consequently, this routine returns to Step #211.

Figure 20:
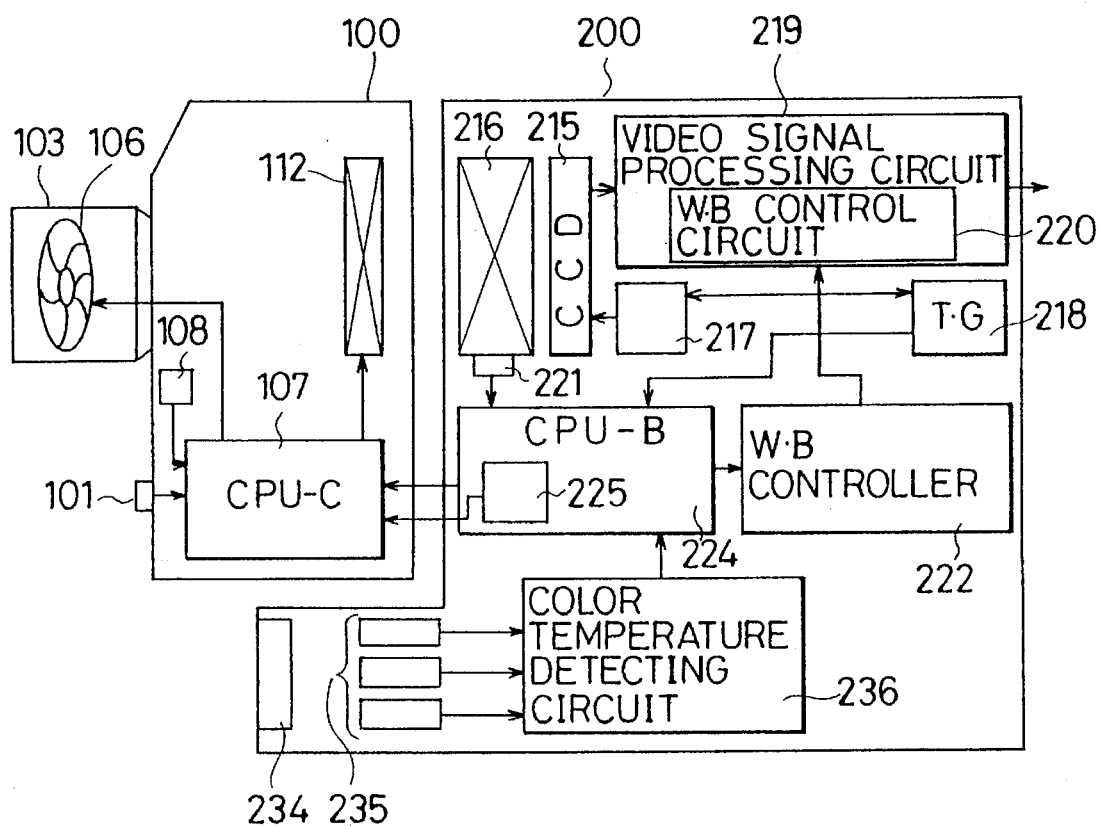
FIG. 20 is a diagram showing a construction of a photographed image recording and reproducing system as a second embodiment of the invention.

FIG. 20 is a diagram showing a construction of a photographed image recording and reproducing system as a second embodiment of the invention.

In this figure, an optical filter 234, a light receiving sensor 235, and a color temperature detecting circuit 236 are provided in place of the WB switch 226 shown in FIG. 4A. It will be appreciated that the flash device 104, the viewfinder 227, DC/DC converter 223, the switch SW1, the DAT recorder 300, etc. are omitted in this figure for the sake of convenience.

The light receiving sensor 236 includes three light receiving elements for receiving the color components of R (red), G (green), and B (blue), of the light. The light passed through the optical filter 234 is received by the light receiving sensor 235 and the R-, G-, and B-color components are input to the color temperature detecting circuit 236. The detecting circuit 236 discriminates the color temperature of the light source based on the energy distribution of the respective R-, G-, and B-color components, and outputs this light source information to a CPU 224. The CPU 224 in turn sets the specified sensitivity corresponding to the light source in a sensitivity setting circuit 225 based on the light source information, and outputs the sensitivity information to a CPU 107. The CPU 224 also outputs the light source information to a WB control circuit 220 by way of a WB controller 222. A specified WB correction value corresponding to the color temperature of the light source is set in the WB circuit 2202 provided in the WB control circuit 220 based on the received light source information.

In this embodiment, the sensitivity and the WB correction value are set automatically upon receiving the light reflected by an object, thereby obviating the cumbersome operation of manually setting the light source information.

Figure 21:
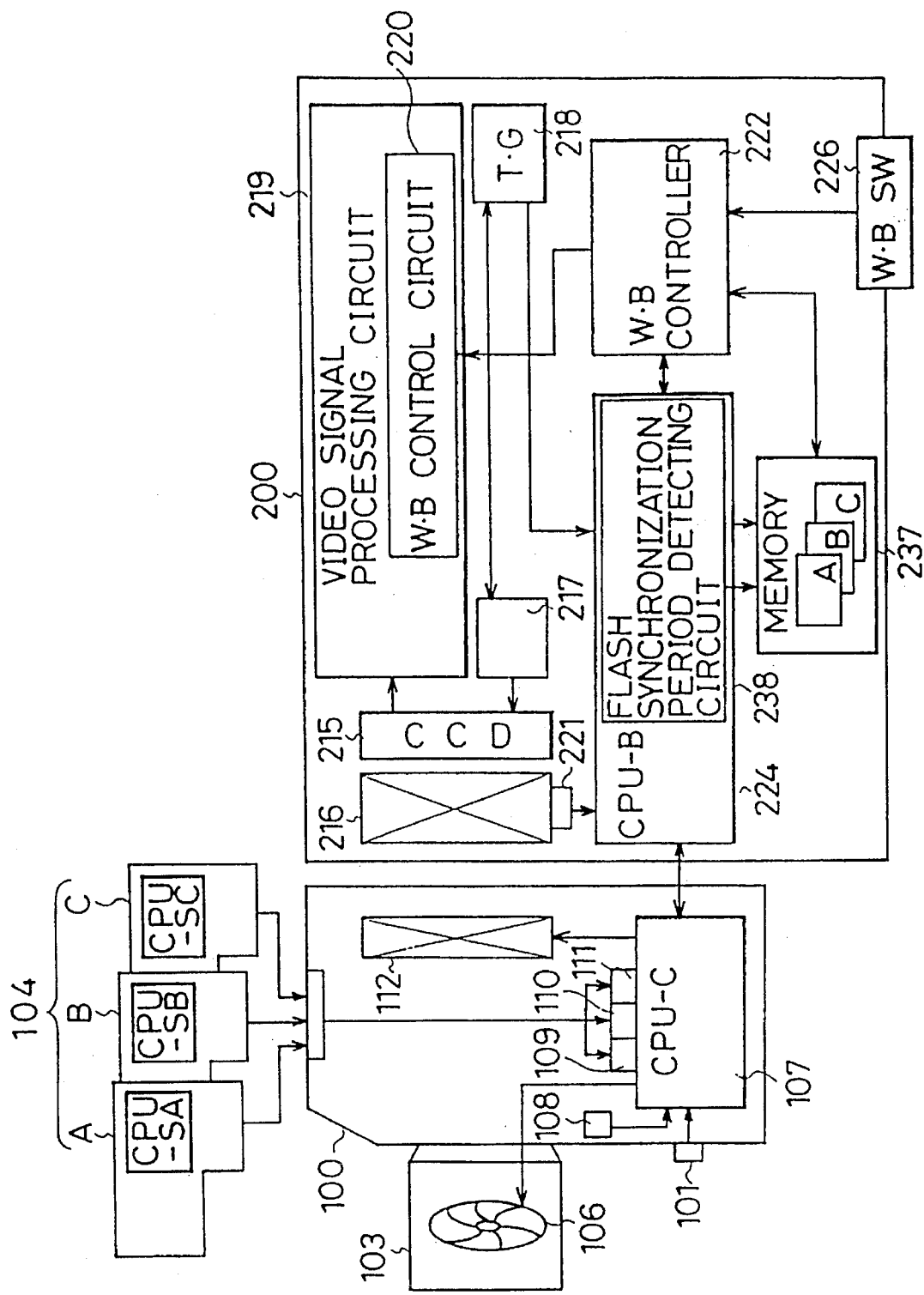
FIG. 21 is a diagram showing a construction of a photographed image recording and reproducing system as a third embodiment of the invention.

FIG. 21 is a diagram showing a construction of a photographed image recording and reproducing system as a third embodiment of the invention.

In this figure, a memory 237 and a flash synchronization period detecting circuit 238 are additionally provided to the construction shown in FIG. 4A. It will be appreciated that the flash device 104, the viewfinder 227, DC/DC converter 223, the switch SW1, the sensitivity setting circuit, the DAT recorder 300, etc. are omitted in this figure for the sake of convenience.

The color temperature of the light emitted from the flash device 104 differs depending upon not only the type of the flash device to be mounted, but also a light emitting period. That is to say, the color temperature differs if the same flash device 104 is used, but the light emitting period is changed. In this embodiment, a suitable WB correction is performed according to the color temperature determined by the light emitting period of the flash device 104.

To a still video camera shown in FIG. 21 are mountable, for example, three types of flash devices A, B, C for emitting the lights having different color temperatures. A conversion table defining correspondence between the light emitting period and the color temperature for each of the flash devices A, B, and C is stored in the memory 237. The flash synchronization period detecting circuit 238 detects a light emitting period tF (a period defined by timings ⑦ and ⑧ in FIG. 11) in accordance with an F1 signal and an F3 signal.

When the flash firing photographing operation is started upon depression of a release button 101, the light emitting period of the flash device 104 is detected by the flash synchronization period detecting circuit 238. The information concerning the type of the mounted flash device 104 and the light emitting period tF is output to the memory 237. The memory 237 reads the color temperature of the emitted light based on the received information, and outputs the color temperature information to a WB controller 222. Based on the input color temperature information, the controller 222 sends a specified control signal to a WB correcting circuit 220 so as to set therein a WB correction value corresponding to the specified color temperature determined by the light emitting period tF of the flash device 104. In this way, the WB correction is applied to an image signal obtained in the flash firing photographing operation at a WB correction value suitable at the time of the flash synchronization.

As described above, in the foregoing embodiments, the color temperature of light emitted from a flash device 104 is detected, and a suitable WB correction value is set according to the detection result. Accordingly, a suitable WB correction can be applied to an image signal obtained as a result of a photographing operation in which the flash device 104 is fired.

What is claimed is:

1. A recording system comprising:

a mount portion in which one of a record medium and a cleaning member is mounted;

a device for recording data on the record medium;

a first device for discriminating whether an error occurs in a recording operation;

a device responsive to said first discriminating device for discharging the record medium from said mount portion when an error is discriminated to occur;

a second device for discriminating whether the cleaning member is mounted in said mount portion in place of the record medium; and a control device responsive to said first and second discriminating devices for controlling said recording device to suspend the recording operation unless the cleaning member is discriminated to be mounted in the case of the record medium being discharged for occurrence of an error.

2. A recording system as defined in claim 1 further comprising a display device responsive to said first discriminating device for providing a warning indicative of occurrence of an error when the error is discriminated to occur.

3. A recording system comprising:

a mount portion in which a selected record medium is mounted;

a device for recording data on the selected record medium when the selected record medium is mounted in said mount portion;

a first device for discriminating whether an error occurs in a recording operation;

a device responsive to said first discriminating device for automatically discharging the selected record medium from said mount portion when an error in the recording operation of said selected record medium is discriminated to occur;

a second device for discriminating whether the selected record medium presently mounted in said mount portion is different from a latest discharged record medium discharged from said mount portion; and a display device responsive to said second discriminating device for providing a warning indicative of a different record medium being mounted when the different record medium is discriminated to be mounted in said mount portion.

4. A recording system as defined in claim 3, wherein said discharging device is also responsive to said second discriminating device for discharging the different record medium from said mount portion when the different record medium is discriminated to be mounted in said mount portion.

5. A recording system as defined in claim 3, wherein the record medium is provided with information concerning an image recorded on the record medium, and said second discriminating device executes discrimination of a different record medium based on said information.

6. A recording system as defined in claim 5, wherein said information is index information.

* * * * *